(12) United States Patent
Ishikawa et al.

(10) Patent No.: US 12,217,409 B2
(45) Date of Patent: Feb. 4, 2025

(54) INFORMATION PROCESSING DEVICE AND INFORMATION PROCESSING METHOD

(71) Applicant: SONY GROUP CORPORATION, Tokyo (JP)

(72) Inventors: Tomoya Ishikawa, Tokyo (JP); Yohsuke Kaji, Tokyo (JP); Gaku Narita, Tokyo (JP); Takashi Seno, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 558 days.

(21) Appl. No.: 17/603,679

(22) PCT Filed: Apr. 10, 2020

(86) PCT No.: PCT/JP2020/016219
§ 371 (c)(1),
(2) Date: Oct. 14, 2021

(87) PCT Pub. No.: WO2020/218041
PCT Pub. Date: Oct. 29, 2020

(65) Prior Publication Data
US 2022/0237769 A1   Jul. 28, 2022

(30) Foreign Application Priority Data
Apr. 23, 2019  (JP) .................. 2019-081641

(51) Int. Cl.
*G06T 7/00* (2017.01)
*G06F 3/04815* (2022.01)
(Continued)

(52) U.S. Cl.
CPC ........ *G06T 7/0004* (2013.01); *G06F 3/04815* (2013.01); *G06T 7/73* (2017.01); *G06V 20/20* (2022.01); *G06V 20/36* (2022.01)

(58) Field of Classification Search
CPC ......... G06T 7/0004; G06T 7/73; G06T 19/00; G06F 3/04815; G06F 3/011; G06V 20/20; G06V 20/36
See application file for complete search history.

(56) References Cited

U.S. PATENT DOCUMENTS 8,411,092 B2 *  4/2013  Sheblak .................. A63F 13/52
                                                                345/428
9,445,084 B2 *  9/2016  Shikata ................ H04N 13/156
(Continued)

FOREIGN PATENT DOCUMENTS

JP   5908855 B2     4/2016
JP   2018-124515 A  8/2018
JP   2018-142090 A  9/2018

OTHER PUBLICATIONS

International Search Report and Written Opinion of PCT Application No. PCT/JP2020/016219, issued on Jun. 2, 2020, 11 pages of ISRWO.

(Continued)

*Primary Examiner* — Solomon G Bezuayehu
(74) *Attorney, Agent, or Firm* — CHIP LAW GROUP

(57) ABSTRACT

An information processing device includes: a storage unit that stores first information indicating at least one of a structure or a physical property of a first object obtained by capturing a real physical body into a virtual space; and a specifying unit that specifies an arrangement of a second object indicating a virtual object in the virtual space so that the arrangement is capable of expressing an interaction with the first object, based on an arrangement condition of the second object and on the first information.

10 Claims, 17 Drawing Sheets

(51) Int. Cl.
*G06T 7/73* (2017.01)
*G06V 20/00* (2022.01)
*G06V 20/20* (2022.01)

(56) References Cited

U.S. PATENT DOCUMENTS

| | | | | |
|---|---|---|---|---|
| 2007/0052712 | A1* | 3/2007 | Saito | A63F 13/2145 |
| | | | | 345/473 |
| 2007/0139419 | A1* | 6/2007 | Azuma | A63F 13/426 |
| | | | | 345/619 |
| 2010/0315413 | A1* | 12/2010 | Izadi | G06F 3/0425 |
| | | | | 345/419 |
| 2011/0187638 | A1* | 8/2011 | Chao | G06F 3/013 |
| | | | | 345/156 |
| 2013/0258062 | A1* | 10/2013 | Noh | G06T 17/00 |
| | | | | 348/47 |
| 2014/0118353 | A1* | 5/2014 | Ha | H04N 13/239 |
| | | | | 345/426 |
| 2015/0130701 | A1* | 5/2015 | Kimenkowski | G06F 3/0346 |
| | | | | 345/156 |
| 2015/0204799 | A1* | 7/2015 | Cipriany | G01N 21/9501 |
| | | | | 702/185 |
| 2016/0189428 | A1* | 6/2016 | Matsubayashi | G02B 27/017 |
| | | | | 345/633 |
| 2016/0224829 | A1* | 8/2016 | Chou | G06T 7/11 |
| 2016/0253844 | A1* | 9/2016 | Petrovskaya | G06Q 50/01 |
| | | | | 345/633 |
| 2016/0343166 | A1* | 11/2016 | Inoko | G06T 15/00 |
| 2017/0168559 | A1* | 6/2017 | Jayadevaprakash | G06F 3/0304 |
| 2017/0206643 | A1* | 7/2017 | Weiss | G06F 3/0485 |
| 2017/0228139 | A1* | 8/2017 | Goslin | G06F 3/017 |
| 2018/0199023 | A1* | 7/2018 | Ishikawa | H04N 13/117 |
| 2018/0308281 | A1* | 10/2018 | Okoyama | G06V 20/64 |
| 2018/0357339 | A1* | 12/2018 | Kim | G06F 30/20 |
| 2019/0313059 | A1* | 10/2019 | Agarawala | G06F 3/011 |
| 2020/0117336 | A1* | 4/2020 | Mani | F25B 49/005 |

OTHER PUBLICATIONS

Takahiro Koguchi, "AR, AU Start Development to Grant the Wishes of Anyone Thinking " I Want to Be with My Favorite 2D Character in the Real World, An Experimental Event in Sendai, Engadget.com, Jul. 8, 2017, 10 pages.

* cited by examiner

FIG.5
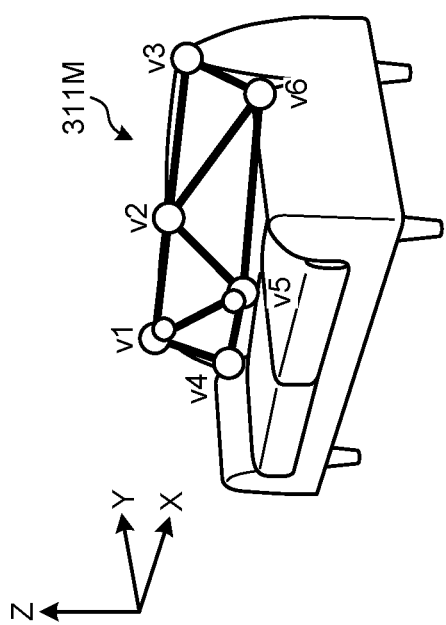
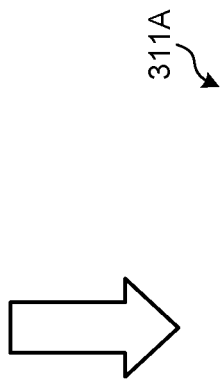
```
PL∈SG
SG = {SEAT, BACKREST, SUPPORT, LEG, AND JOINT}
```
```
v1: (X, Y, Z, R, G, B, PL)
v2: (X, Y, Z, R, G, B, PL)
v3: (X, Y, Z, R, G, B, PL)
...
v1, v2, v5
v1, v5, v4
v2, v3, v6
...
```
VERTEX DEFINITION
MESH DEFINITION

FIG.6

|  | NUMBER OF PARTS | MASS | RIGIDITY | SOFTNESS | LOAD CAPACITY | THERMAL CONDUC-TIVITY | MATERIAL |
|---|---|---|---|---|---|---|---|
| SEAT | 1 | 5kg | LOW | HIGH | 200kg | 0.05 | FABRIC |
| BACKREST | 1 | 5kg | MEDIUM | MEDIUM | 100kg | 0.05 | FABRIC |
| SUPPORT | 1 | 10kg | HIGH | LOW | 200kg | 0.05 | FABRIC |
| LEG | 4 | 1kg | HIGH | LOW | 200kg | 0.2 | WOOD |
| JOINT | 4 | 0.5kg | LOW | MEDIUM | 100kg | 0.05 | FABRIC |

312A

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2020/016219 filed on Apr. 10, 2020, which claims priority benefit of Japanese Patent Application No. JP 2019-081641 filed in the Japan Patent Office on Apr. 23, 2019. Each of the above-referenced applications is hereby incorporated herein by reference in its entirety.

FIELD

The present disclosure relates to an information processing device, an information processing method, and a program.

BACKGROUND

Patent Literature 1 discloses a technique of acquiring a three-dimensional object model corresponding to text display from a three-dimensional object model database and transforming the three-dimensional object model based on an attribute value identified by a text analyzer.

CITATION LIST

Patent Literature

Patent Literature 1: JP 5908855 B2

SUMMARY

Technical Problem

The above-described conventional technology includes a technology of capturing a measured real environment into virtual reality (VR) and providing, to the user, an image obtained by combining an object with the virtual reality. However, the conventional technology has a difficulty in reflecting information such as mass, rigidity, part, and the like lost in the measurement of the real environment to the virtual reality, leading to an occurrence of a gap between the virtual reality object and the object to be combined in some cases.

In view of this, the present disclosure provides an information processing device, an information processing method, and a program capable of suppressing strangeness or incompatibility regarding an object displayed in virtual reality into which a measured real environment has been captured.

Solution to Problem

To solve the problems described above, an information processing device includes: a storage unit that stores first information indicating at least one of a structure or a physical property of a first object obtained by capturing a real physical body into a virtual space; and a specifying unit that specifies an arrangement of a second object indicating a virtual object in the virtual space so that the arrangement is capable of expressing an interaction with the first object, based on an arrangement condition of the second object and on the first information.

Moreover, an information processing method executed by a computer includes: storing, in a storage unit that stores first information indicating at least one of a structure or a physical property of a first object obtained by capturing a real physical body into a virtual space; and specifying an arrangement of a second object indicating a virtual object in the virtual space so that the arrangement is capable of expressing an interaction with the first object, based on an arrangement condition of the second object and on the first information.

Moreover, a program causes a computer to execute: storing, in a storage unit, first information indicating at least one of a structure or a physical property of a first object obtained by capturing a real physical body into a virtual space; and specifying an arrangement of a second object indicating a virtual object in the virtual space so that the arrangement is capable of expressing an interaction with the first object, based on an arrangement condition of the second object and on the first information.

BRIEF DESCRIPTION OF DRAWINGS

FIG. 5 is a diagram illustrating an example of a physical body recognition model.

FIG. 6 is a diagram illustrating an example of a structure/physical property model.

DESCRIPTION OF EMBODIMENTS

Embodiments of the present disclosure will be described below in detail with reference to the drawings. In each of the following embodiments, the same parts are denoted by the same reference symbols, and a repetitive description thereof will be omitted.

First Embodiment

Outline of Display System According to First Embodiment

Figure 1:
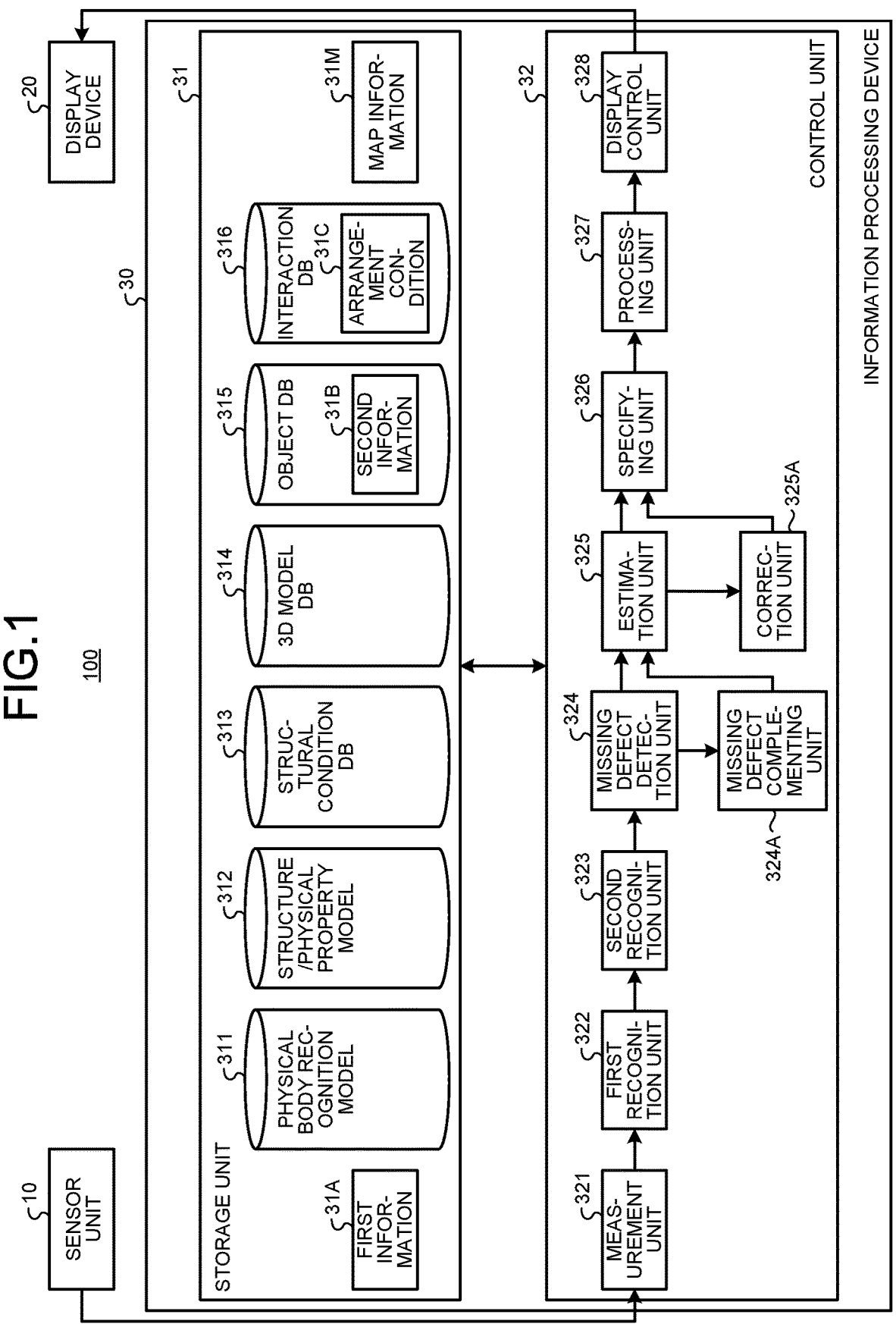
FIG. 1 is a diagram illustrating an example of a configuration of a display system including an information processing device according to a first embodiment.

FIG. 1 is a diagram illustrating an example of a configuration of a display system including an information processing device according to a first embodiment. A display system 100 illustrated in FIG. 1 includes, for example, a head mounted display (HMD), a smartphone, a game machine, and the like. For example, the display system 100 provides a user with an image of virtual reality (VR), live-action VR, augmented reality (AR), and the like. The image includes, for example, a moving image, a still image, and the like. The following will describe an exemplary case where the display system 100 provides a live-action VR image to the user. For example, the live-action VR captures a real environment into a virtual space by measurement, and provides a three-dimensional image obtained by combining an object with the virtual space.

For example, in the live-action VR, when information such as mass, rigidity, and part of a physical body is lost at measurement of the real environment, there is a possibility of occurrence of a gap between an object to be combined with virtual reality and the measured actual physical body. The real environment is, for example, a real environment to be reproduced as a virtual space. Therefore, it is desired, in the live-action VR, to suppress a gap between an object to be combined with virtual reality and a measured actual physical body by reflecting information such as mass, rigidity, part, and the like lost in measurement of the real environment onto virtual reality as much as possible.

Figure 2:
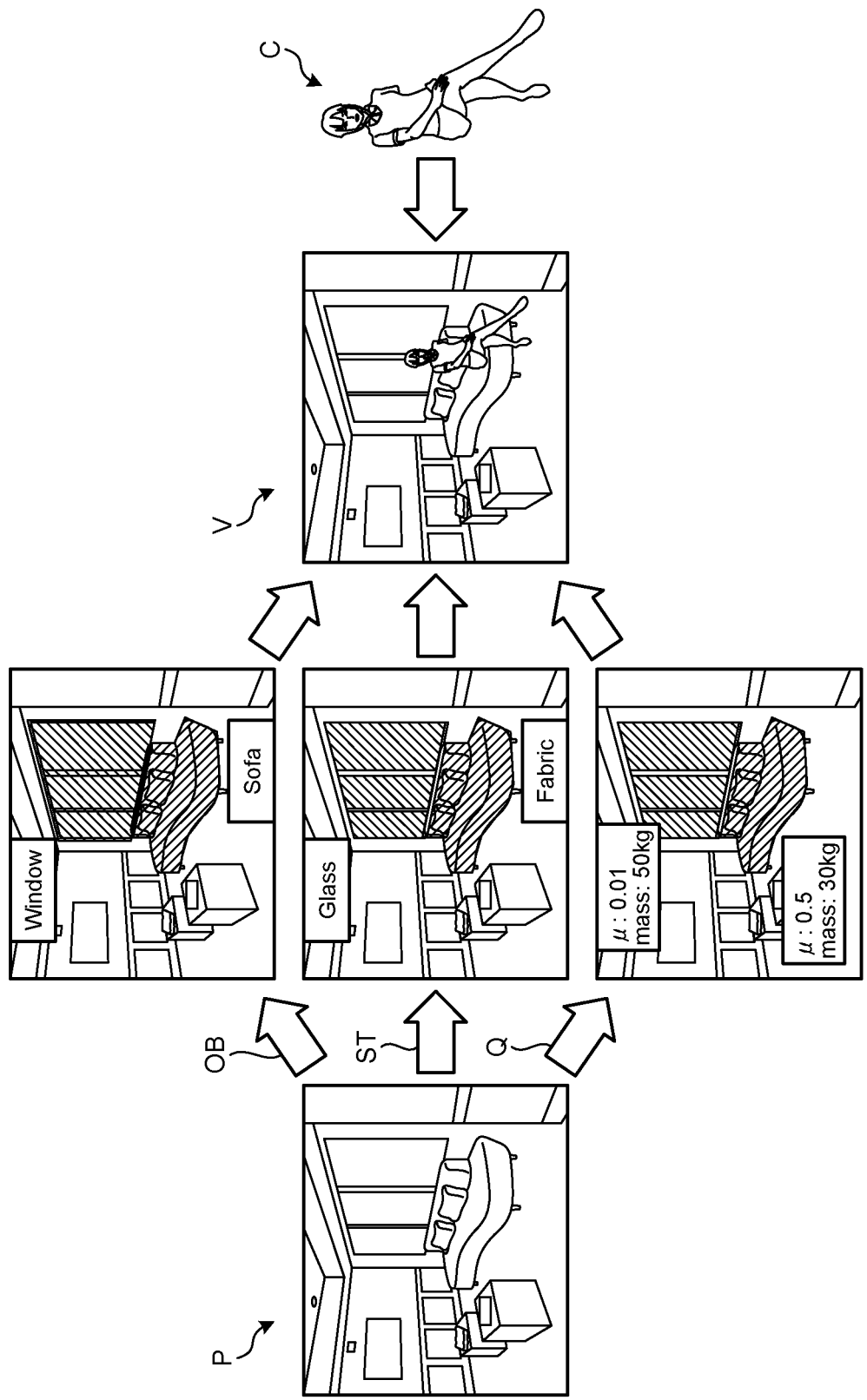
FIG. 2 is a diagram illustrating an example of an outline of the information processing device according to the first embodiment.

FIG. 2 is a diagram illustrating an example of an outline of an information processing device 30 according to the first embodiment. As illustrated in FIG. 2, the information processing device 30 estimates a physical body OB, a structure ST, and a property Q from information obtained by measuring a real environment P. The information processing device 30 arranges an object C in a virtual space V based on an estimation result, thereby providing the user with the virtual space V obtained by integrating the real environment P with the object C. The object C is an example of a second object.

Returning to FIG. 1, the display system 100 includes a sensor unit 10, a display device 20, and the information processing device 30. The information processing device 30 is configured to be communicable with the sensor unit 10 and the display device 20.

The sensor unit 10 includes various sensors and the like that measure the real environment. The sensor unit 10 includes, for example, an imaging device (sensor) such as a time of flight (ToF) camera, an RGB camera, a stereo camera, a monocular camera, an infrared camera, a depth camera, and other cameras. The sensor unit 10 includes, for example, a sensor such as an ultrasonic sensor, a radar, a light detection and ranging or laser imaging detection and ranging (LiDAR), or a sonar. The sensor unit 10 supplies measurement information measured by the sensor to the information processing device 30.

The display device 20 has a function of displaying various types of information. The display device 20 is controlled by the information processing device 30. The display device 20 includes, for example, a display device that displays various types of information. Examples of the display device include a liquid crystal display (LCD) device, an organic light emitting diode (OLED) device, and a touch panel. Furthermore, the display device 20 according to the present embodiment may output information by using a projection function.

[Configuration of Information Processing Device According to First Embodiment]

The information processing device 30 is a dedicated or general-purpose computer, for example. The information processing device 30 includes a storage unit 31 and a control unit 32. For example, the information processing device 30 may be incorporated in the same housing as at least one of the sensor unit 10 or the display device 20. The control unit 32 of the information processing device 30 is electrically connected to the storage unit 31.

The storage unit 31 stores various data and programs. The storage unit 31 is implemented by a semiconductor memory element such as a random access memory (RAM) or a flash memory, or a storage device such as a hard disk or an optical disk, for example. The storage unit 31 stores first information 31A indicating the structure and physical properties of a physical body object obtained by capturing a real physical body into the virtual space V. The physical body object is an example of a first object. The physical body object indicates a physical body obtained by being captured from the real environment into the virtual space V, for example. In the following description, the physical body object may be simply referred to as a physical body. The storage unit 31 stores map information 31M obtained by measuring the real environment. The map information 31M includes information regarding the real environment, such as a three-dimensional shape, color information, position information for each physical body, category information, and the like.

The storage unit 31 stores information such as a physical body recognition model 311, a structure/physical property model 312, a structural condition database (DB) 313, a 3D model DB 314, an object DB 315, and an interaction DB 316, for example. The physical body recognition model 311 includes data indicating a model for recognizing a physical body subjected to machine learning, for example. The structure/physical property model 312 has data indicating a model for recognizing the structure and physical properties of a physical body, for example, the structural condition DB 313 includes data indicating a structural condition for recognizing a physical body subjected to machine learning, for example. The 3D model DB 314 has information indicating the shape, structure, physical properties, and the like of the physical body subjected to machine learning, for example. The 3D model DB 314 is constructed using, for example, 3D modeling software or the like. The object DB 315 includes, for example, data indicating the structure and physical properties of the object C. The object C is an example of a second object. The object DB 315 includes second information 31B indicating the characteristic of the object C. The interaction DB 316 includes data indicating an arrangement condition 31C of the object C. In the interaction DB 316, for example, the arrangement condition 31C indicating an interaction to be performed by the object C is set by a game designer or the like. The arrangement condition 31C includes, for example, an arrangement condition 31C of the object C, such as "sitting down", "standing up", "lying", "reclining", and the like.

In the present embodiment, there is no need to store all of the physical body recognition model 311, the structure/physical property model 312, the structural condition DB 313, the 3D model DB 314, the object DB 315, and the interaction DB 316 in the storage unit 31, and these may be stored in an information processing server, a storage device, or the like accessible from the information processing device 30, for example.

The control unit 32 includes functional units such as a measurement unit 321, a first recognition unit 322, a second recognition unit 323, a missing defect detection unit 324, an estimation unit 325, a specifying unit 326, a processing unit 327, and a display control unit 328. In the present embodiment, the control unit 32 further includes functional units such as a missing defect complementing unit 324A and a correction unit 325A. Each of the functional units of the control unit 32 is implemented by execution of programs stored in the information processing device 30 by a central processing unit (CPU), a micro control unit (MCU), or the like, using random access memory (RAM) or the like, as a working area. In addition, each of the functional units may be implemented by an integrated circuit such as an application specific integrated circuit (ASIC) or a field-programmable gate array (FPGA).

The measurement unit 321 measures a real physical body provided in the real environment P based on the sensor information of the sensor unit 10. The measurement unit 321 measures a geometric shape in the real environment P using a known three-dimensional measurement technique, for example. Examples of applicable three-dimensional measurement techniques include techniques such as ToF and Structure-from-Motion. The measurement unit 321 supplies measurement information indicating a geometric shape, a position, and the like in the real environment P to the first recognition unit 322. The measurement unit 321 stores the measurement information in the storage unit 31 as the map information 31M of the real environment P.

The first recognition unit 322 recognizes a physical body in the real environment P based on the measurement information from the measurement unit 321. For example, the physical body recognition model 311 includes a plurality of models such as a sofa, a chair, a window, a television, a table, a desk, a mat, a human, and an animal. In this case, the first recognition unit 322 searches for a model that matches or resembles the geometric shape indicated by the measurement information from among the models of the physical body recognition model 311, and recognizes the physical body in the real environment P as a physical body object based on the model. The first recognition unit 322 supplies the recognition result to the second recognition unit 323.

The second recognition unit 323 recognizes the structure, physical properties, and the like of the physical body object recognized by the first recognition unit 322. For example, the structure/physical property model 312 has a model that associates the above-described model with the structure and physical properties. For example, the second recognition unit 323 searches for a model that matches or resembles the recognized physical body object from among the models of the structure/physical property model 312, and recognizes the structure and physical properties indicated by the model as the structure and physical properties of the physical body. The second recognition unit 323 generates the first information 31A indicating a recognition result, and stores the generated first information 31A in the storage unit 31 in association with the recognized physical body object. Note that the second recognition unit 323 is an example of a recognition unit, and the first recognition unit 322 may be included in the configuration.

The missing defect detection unit 324 detects a structural missing defect in the recognized physical body object. For example, in a case where the sensor unit 10 measures the real environment P, there is a case where it is difficult to measure the entire shape of the physical body due to the measurement angle and the positional relationship between the physical bodies. The missing defect detection unit 324 detects a missing defect in the physical body based on the structural condition of the physical body provided in the structural condition DB 313. The structural condition of a physical body includes, for example, a condition for recognizing a structure such as components of the physical body and a positional relationship of the components. For example, when the physical body is a chair, the components of the physical body are required, as a condition, to have a structure having a seat and a plurality of legs. The missing defect detection unit 324 performs physical simulation on the recognized physical body to detect a missing defect, safety, or the like of the physical body. The physical simulation is, for example, a program for confirming behavior and stability of a physical body. The missing defect detection unit 324 supplies a detection result to the specifying unit 326.

When the missing defect detection unit 324 has detected a missing defect, the missing defect complementing unit 324A changes the first information 31A to complement the missing defect. The missing defect complementing unit 324A recognizes a missing defect portion of the physical body object based on data such as the shape, structure, and physical properties of the 3D model (physical body) included in the 3D model DB 314, for example, and complements the missing defect portion. After having complemented the missing defect, the missing defect complementing unit 324A adds information corresponding to the complemented portion to the first information 31A.

The estimation unit 325 estimates an interaction between the plurality of recognized physical bodies. For example, the estimation unit 325 specifies the positional relationship between the recognized physical bodies and estimates an interaction between the physical bodies based on the first information 31A for each of the physical bodies. In a case where the interaction between the physical bodies has been successfully estimated, the estimation unit 325 evaluates the interaction. For example, the estimation unit 325 evaluates a difference in the degree of deformation depending on the presence or absence of interaction. Specifically, the estimation unit 325 searches the 3D model DB 314 for a model resembling the physical body object, and evaluates the degree of deformation of the physical body object by using the shape of a portion having no interaction in the extracted model. In addition, in a case where the interaction between the physical bodies has not been successfully estimated, the estimation unit 325 does not change the first information 31A.

The correction unit 325A corrects the first information 31A regarding the physical body object based on the result of evaluating the degree of deformation of the physical body by the estimation unit 325. In a case where information such as the amount of deformation is obtained in the evaluation of the degree of deformation of the physical body object, the correction unit 325A corrects the first information 31A so as to approach the information. With this configuration, in a case where an interaction occurs between physical bodies, the correction unit 325A can reflect the interaction onto the first information 31A.

The specifying unit 326 specifies an arrangement of the object C in the virtual space V so that the arrangement is capable of expressing the interaction with the physical body object based on the arrangement condition 31C of the object C and on the first information 31A. For example, the capability of expressing the interaction represents a capability of displaying the object C according to the interaction between the physical bodies. For example, the specifying unit 326 searches the virtual space V for the optimum arrangement of the object C so as to satisfy the arrangement condition 31C of the object C. The specifying unit 326 stores the specified result in the storage unit 31.

For example, the specifying unit 326 specifies an arrangement of the object C in the virtual space V so that the arrangement satisfies physical conditions between a part of the object C and the physical body object corresponding to the arrangement condition 31C and so that the arrangement is capable of expressing the interaction with the physical body object. For example, the specifying unit 326 specifies an arrangement of the object C in the virtual space V so that the arrangement is capable of expressing the interaction with the physical body object based on the positional relationship between the object C and the physical body object in the virtual space V.

The specifying unit 326 specifies an arrangement of the object C in the virtual space V so that the arrangement is capable of expressing the interaction with the physical body object based on the second information 31B of the object DB 315, the arrangement condition 31C of the object C, and the first information 31A.

In a case where it is not possible to specify the arrangement of the object C in the virtual space V so that the arrangement is capable of expressing the interaction with the physical body object, the specifying unit 326 specifies the arrangement of the object C based on another arrangement condition 31C different from the arrangement condition 31C.

In a case where it is not possible to specify the arrangement of the object C in the virtual space V so that the arrangement is capable of expressing the interaction with the physical body object, the specifying unit 326 does not arrange the object C in the virtual space V. With this configuration, the information processing device 30 can prevent an occurrence of a gap between the physical body object and the object C.

The processing unit 327 executes a process of expressing an interaction between the physical body object and the object C based on the arrangement of the object C in the virtual space V specified by the specifying unit 326 and the first information 31A. For example, the processing unit 327 executes physical simulation based on the structure, physical properties, and the like of the physical body, thereby expressing the interaction between the physical body object and the object C. The processing unit 327 stores the processing result in the storage unit 31.

The display control unit 328 performs control to create a VR image reflecting the processing result of the processing unit 327 and display the VR image on the display device 20. The display control unit 328 instructs the display device 20 to display the VR image. As a result, the display device 20 displays the VR image expressing the interaction between the physical body object obtained by capturing the real environment into the virtual space, and the object C.

The functional configuration example of the information processing device 30 according to the present embodiment has been described as above. The above configuration described with reference to FIG. 1 is merely an example, and the functional configuration of the information processing device 30 according to the present embodiment is not limited to such an example. The functional configuration of the information processing device 30 according to the present embodiment can be flexibly modified in accordance with specifications and applications.

[Processing Procedure of Information Processing Device According to First Embodiment]

Figure 3:
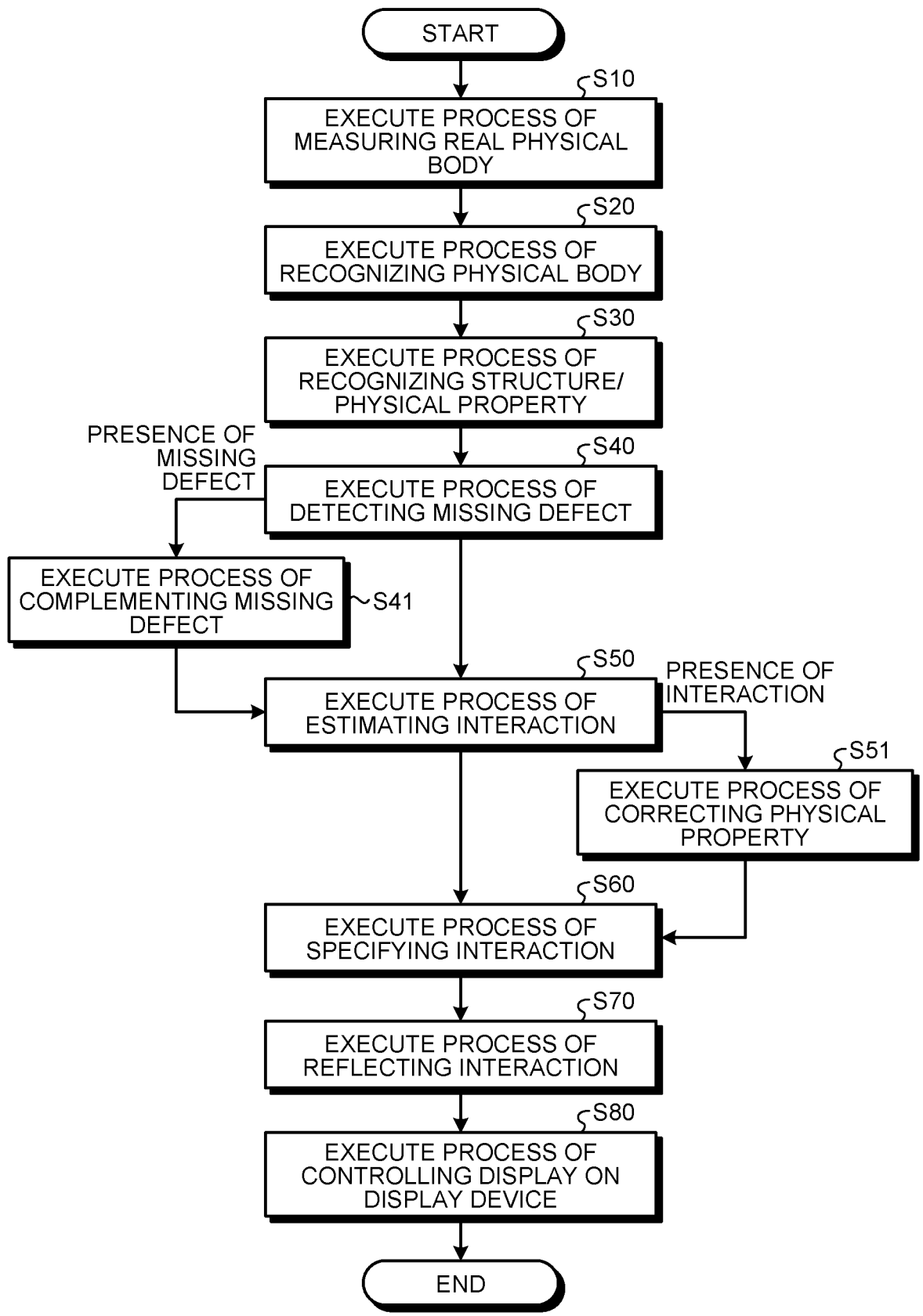
FIG. 3 is a flowchart illustrating an example of a processing procedure executed by the information processing device according to the first embodiment.

Next, an example of a processing procedure of the information processing device 30 according to the first embodiment will be described. FIG. 3 is a flowchart illustrating an example of a processing procedure executed by the information processing device 30 according to the first embodiment. The processing procedure illustrated in FIG. 3 is actualized by execution of a program by the control unit 32 of the information processing device 30. The processing procedure illustrated in FIG. 3 is repeatedly executed by the control unit 32.

As illustrated in FIG. 3, the control unit 32 of the information processing device 30 executes a process of measuring a real physical body (step S10). For example, the control unit 32 measures a geometric shape in the real environment P as a real physical body based on the sensor information of the sensor unit 10, and stores measurement information indicating a measurement result in the storage unit 31. By executing the process of step S10, the control unit 32 functions as the measurement unit 321 described above. After completion of the process of step S10, the control unit 32 proceeds to the process of step S20.

The control unit 32 executes a process of recognizing a physical body (step S20). For example, the control unit 32 recognizes a physical body in the real environment P based on the measurement information and the physical body recognition model 311. The control unit 32 recognizes a structure, a category, and the like for each of the recognized physical bodies.

Figure 4:
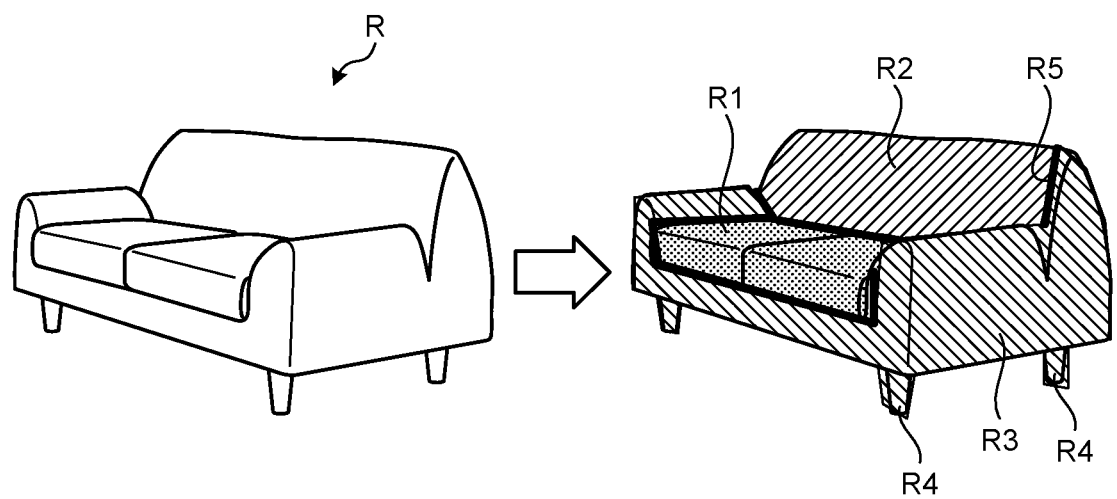
FIG. 4 is a diagram illustrating an example in which the information processing device recognizes a physical body.

An example of the process of recognizing a physical body by the control unit 32 will be described with reference to FIGS. 4 and 5. FIG. 4 is a diagram illustrating an example in which the information processing device 30 recognizes a physical body. FIG. 5 is a diagram illustrating an example of the physical body recognition model 311.

In the example illustrated in FIG. 4, the control unit 32 searches for a model that matches or resembles the geometric shape indicated by the measurement information from among the models of the physical body recognition model 311, and recognizes that a physical body object R is a sofa. In addition, an example illustrated in FIG. 5 represents a relationship between a model 311M of the physical body recognition model 311 and shape information 311A. The shape information 311A is stored in the physical body recognition model 311. The shape information 311A includes information of a vertex definition and a mesh definition. The vertex definition defines vertex coordinates XYZ of points v1, v2, v3, v4, v5, and the like, vertex colors RGB, and a structural label PL regarding the model 311M. The structural label PL is an element of a set SG. In an example illustrated in FIG. 5, the set SG is a set regarding a sofa, and includes a seat, a backrest, a support, legs, and joints. The mesh definition defines an index list of three vertices constituting a triangle in the model 311M. The control unit 32 compares the shape information 311A of the physical body recognition model 311 with the measured geometric shape, and searches for the model 311M from the physical body recognition model 311.

Returning to FIG. 4, the control unit 32 recognizes the structure indicated by the model 311M searched from the physical body recognition model 311 as a structure of the physical body object R. In this case, the control unit 32 recognizes that the physical body object R includes elements such as a seat R1, a backrest R2, a support R3, legs R4, and joints R5.

Returning to FIG. 3, after completion of the process of step S20, the control unit 32 proceeds to the process of step S30. Note that the control unit 32 executes the process of step S20, thereby functioning as the first recognition unit 322 described above.

The control unit 32 executes a process of recognizing the structure and physical properties (step S30). For example, the control unit 32 searches for a model that matches or resembles the recognized physical body from among the models of the structure/physical property model 312, and recognizes the structure and physical properties indicated by the model as the structure and physical properties of the physical body.

The structure/physical property model 312 stores physical property information 312A illustrated in FIG. 6 in association with the model 311M. FIG. 6 is a diagram illustrating an example of the structure/physical property model 312. The physical property information 312A indicates a relationship between an element of the model 311M and a physical property. For example, in the physical property information 312A, information such as the number of parts, mass, rigidity, softness, load capacity, thermal conductivity, and material is set for each of elements of the model 311M. Note that the higher the rigidity of the physical property information 312A, the less likely the physical body is to be deformed. The higher the softness of the physical property information 312A, the softer the physical body is.

The control unit 32 extracts the physical property information 312A associated with the model 311M from the structure/physical property model 312, and recognizes the information as physical properties of the elements of the physical body object R based on the physical property information 312A. For example, regarding the physical body object R of the sofa illustrated in FIG. 4, the control unit 32 recognizes, from the extracted physical property information 312A, that the physical body object R has physical properties such as high softness in the seat R1, moderate softness in the backrest R2, and high rigidity in the support R3.

Returning to FIG. 3, after associating the recognition result of the physical body object R with the measurement information, the control unit 32 proceeds to the process of step S40. Note that the control unit 32 executes the process of step S30, thereby functioning as the second recognition unit 323 described above.

The control unit 32 executes a process of detecting a missing defect (step S40). For example, the control unit 32 detects a structural missing defect of the recognized physical body object R based on the structural condition of the physical body provided in the structural condition DB 313.

The control unit 32 executes the process of step S40, thereby functioning as the missing defect detection unit 324 described above.

Figure 7:
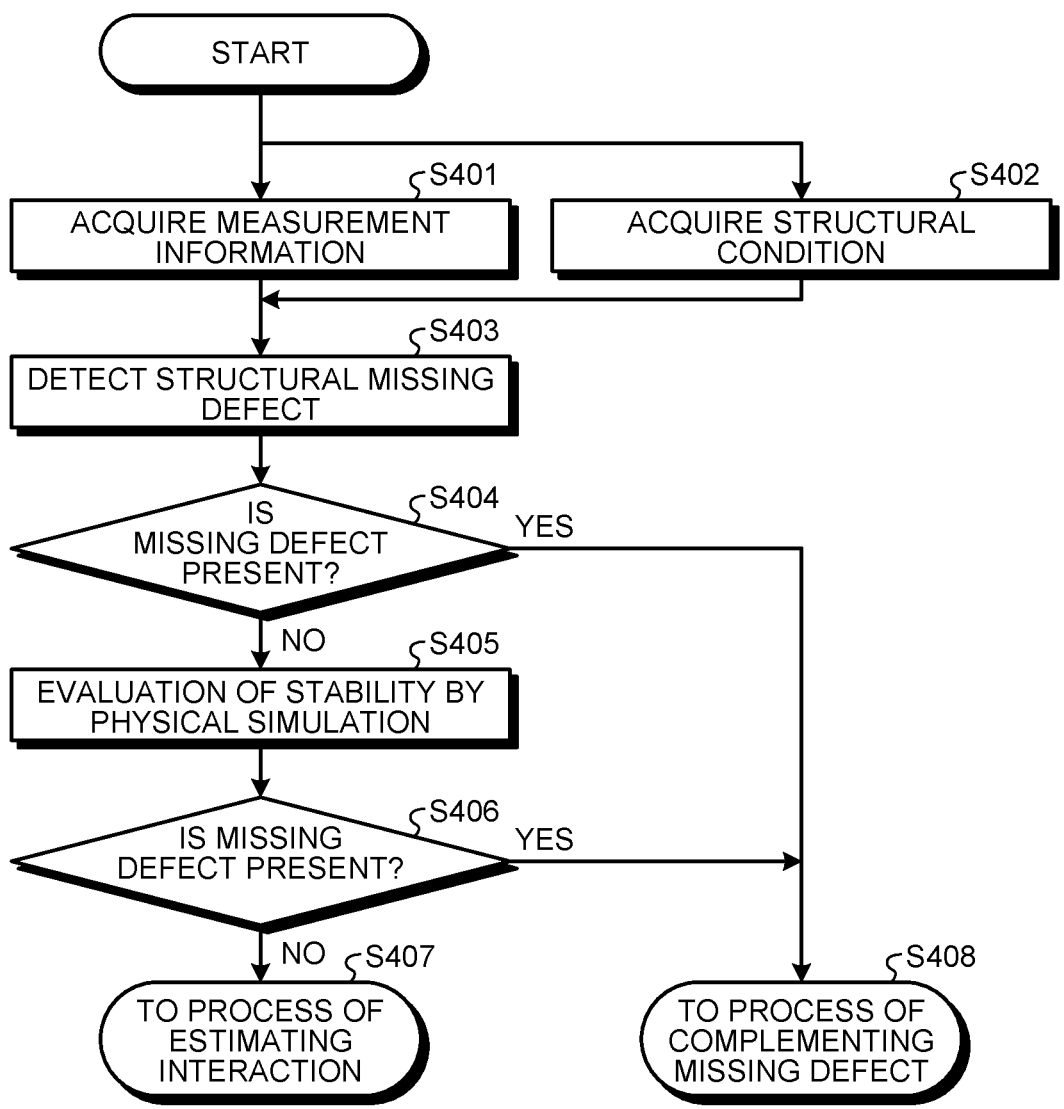
FIG. 7 is a flowchart illustrating an example of a processing procedure of missing defect detection executed by the information processing device according to the first embodiment.

FIG. 7 is a flowchart illustrating an example of a processing procedure of missing defect detection executed by the information processing device 30 according to the first embodiment. The processing procedure illustrated in FIG. 7 is implemented by execution of the process of step S40 by the control unit 32. As illustrated in FIG. 7, the control unit 32 acquires measurement information (step S401). For example, the control unit 32 acquires measurement information associated with a recognition result. The control unit 32 acquires the structural condition (step S402). For example, the control unit 32 acquires, from the structural condition DB 313, a structural condition associated with a model that matches or resembles the recognized physical body object R.

After completion of the processes in steps S401 and S402, the control unit 32 detects a structural missing defect (step S403). For example, the control unit 32 compares the measurement information with the structural condition, and detects absence of an essential part of the physical body object R. Specifically, in a case where the physical body object R is a sofa, the control unit 32 detects a missing defect of the physical body object R based on structural and positional relationships of parts, such as insufficient number of legs, and the absence of legs under the seat. The control unit 32 stores the detection result in the storage unit 31 and proceeds to the process of step S404.

The control unit 32 determines whether there is a missing defect based on the detection result (step S404). In a case where it is determined that there is a missing defect (Yes in step S404), the control unit 32 finishes the processing procedure illustrated in FIG. 7 and proceeds to a process of complementing the missing defect in step S41 illustrated in FIG. 3 (step S408). The process of step S41 will be described below.

When having determined that there is no missing defect (No in step S404), the control unit 32 proceeds to the process of step S405. The control unit 32 evaluates safety by physical simulation (step S405). For example, by executing the physical simulation described above, the control unit 32 evaluates the missing defect and the safety of the physical body object R. For example, when the physical body object R is found to lack safety by execution of the physical simulation, the control unit 32 recognizes that there is a missing defect in the physical body object R. When the physical body object R is found to have safety, the control unit 32 recognizes that there is no missing defect in the physical body object R.

Figure 8:
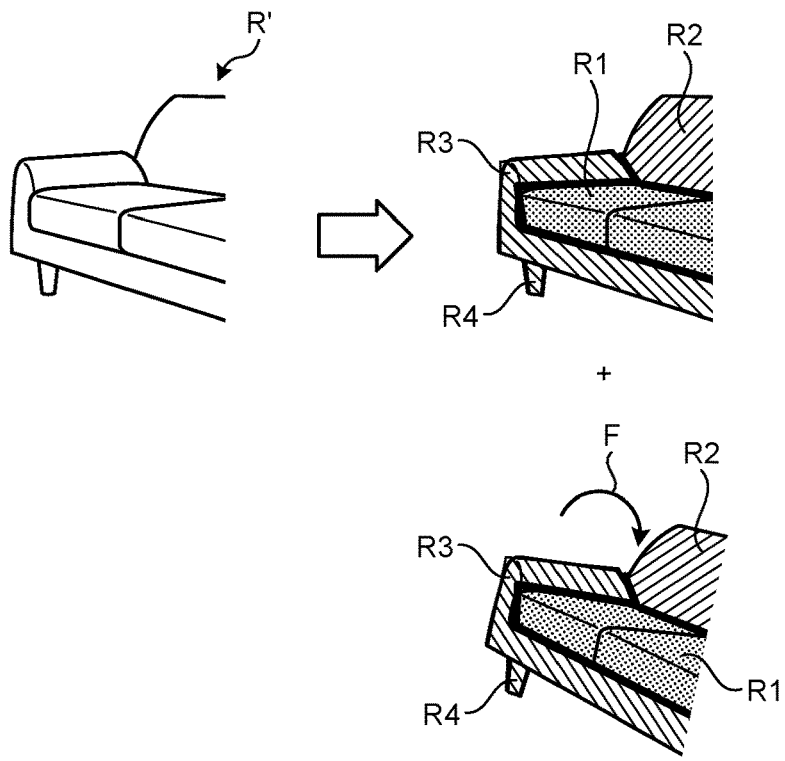
FIG. 8 is a diagram illustrating an example in which the information processing device detects a missing defect in a physical body.

FIG. 8 is a diagram illustrating an example in which the information processing device 30 detects a missing defect in a physical body. As illustrated in FIG. 8, the information processing device 30 measures a physical body object R', and recognizes that the physical body object R' includes a seat R1, a backrest R2, a support R3, and legs R4. In this case, the control unit 32 detects a missing defect in which the right side of the physical body object R' is missing based on the positional relationship between the seat R1, the backrest R2, the support R3, and the legs R4 of the physical body object R'. For example, when the number of legs is insufficient, the sofa falls or tilts due to the action of gravity. For example, the shape of the sofa cannot be maintained and deforms unless a highly soft portion is supported by a high rigidity part. The physical simulation is a simulation for evaluating the stability of the recognized physical body. In the example illustrated in FIG. 8, in a case where evaluation is performed to apply force to the physical body object R' in a plurality of directions by physical simulation, the control unit 32 evaluates that the stability is low (poor) because the physical body object R' is inclined in a direction of an arrow F.

Returning to FIG. 7, the control unit 32 determines whether there is a missing defect based on the evaluation result of step S405 (step S406). When having determined that there is no missing defect (No in step S406), the control unit 32 finishes the processing procedure illustrated in FIG. 7 and proceeds to the process of estimating the interaction in step S50 illustrated in FIG. 3 (step S407). The process of step S50 will be described below.

When having determined that there is a missing defect (Yes in step S406), the control unit 32 finishes the processing procedure illustrated in FIG. 7 and proceeds to a process of complementing the missing defect in step S41 illustrated in FIG. 3 (step S408).

Returning to FIG. 3, the control unit 32 executes the process of complementing the missing defect (step S41). For example, the control unit 32 recognizes a missing defect portion of the physical body object R based on data such as the shape, structure, and physical properties of the physical body included in the 3D model DB 314, and complements the missing defect portion. After complementing the missing defect, the control unit 32 adds information corresponding to the complemented portion to the first information 31A. The control unit 32 executes the process of step S41, thereby functioning as the missing defect complementing unit 324A described above.

Figure 9:
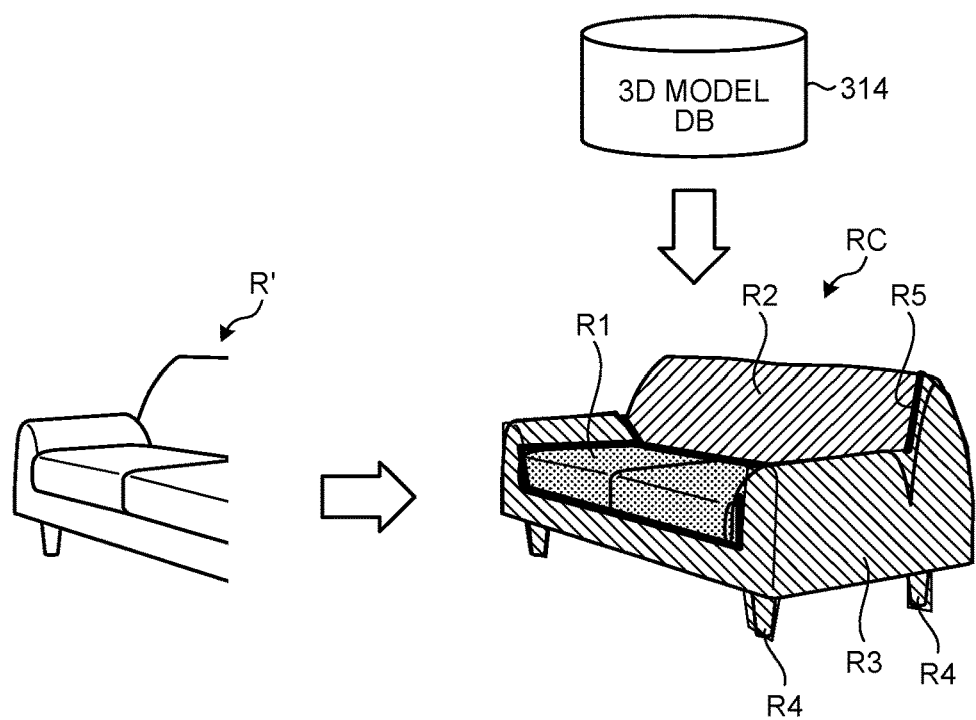
FIG. 9 is a diagram illustrating an example in which the information processing device complements a missing defect in a physical body.

FIG. 9 is a diagram illustrating an example in which the information processing device 30 complements a missing defect in a physical body. As illustrated in FIG. 9, the information processing device 30 measures a physical body object R', and recognizes that the physical body object R' includes a seat R1, a backrest R2, a support R3, and legs R4. In this case, the control unit 32 extracts a 3D model that matches or resembles the physical body object R' from the 3D model DB 314. The control unit 32 recognizes a missing defect portion of the physical body object R' based on data such as the shape, structure, and physical properties of the 3D model, and complements the missing defect portion. In the example illustrated in FIG. 9, a portion on the right side of the physical body object R' is missing, and thus, the control unit 32 complements the portion on the right side of the physical body object R' based on the 3D model. As a result, the control unit 32 can obtain a physical body object RC including a seat R1, a backrest R2, a support R3, legs R4, and joints R5.

Returning to FIG. 3, after adding the information corresponding to the portion obtained by complementing the missing defect to the first information 31A, the control unit 32 proceeds to the process of step S50.

The control unit 32 executes a process of estimating interaction (step S50). For example, the control unit 32 specifies the positional relationship between the recognized physical bodies and estimates an interaction between the physical bodies based on the first information 31A for each of the physical body objects R. Note that the control unit 32 executes the process of step S50, thereby functioning as the estimation unit 325 described above.

Figure 10:
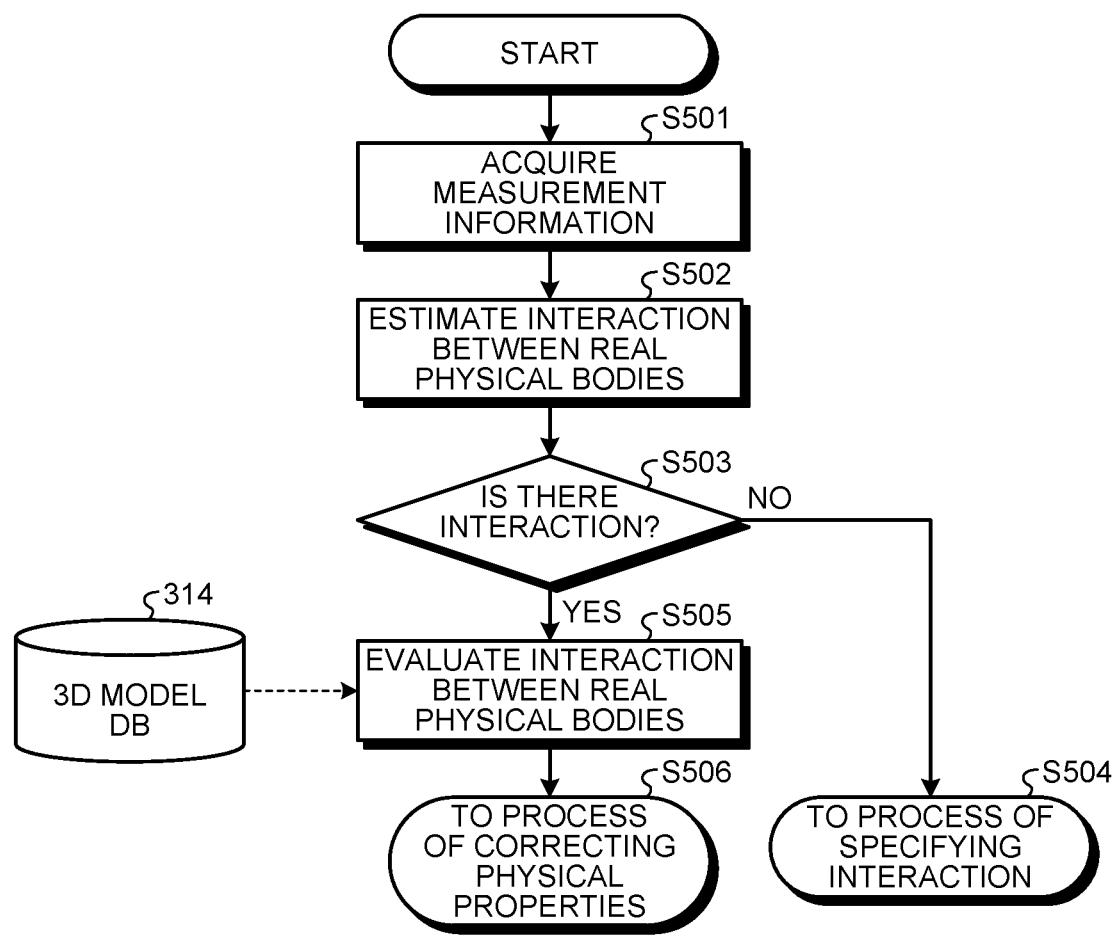
FIG. 10 is a flowchart illustrating an example of a processing procedure of interaction estimation executed by the information processing device according to the first embodiment.

FIG. 10 is a flowchart illustrating an example of a processing procedure of interaction estimation executed by the information processing device 30 according to the first embodiment. The processing procedure illustrated in FIG. 10 is implemented by execution of the process of step S50 by the control unit 32. As illustrated in FIG. 10, the control unit 32 acquires measurement information (step S501). For example, the control unit 32 acquires measurement information associated with a recognition result. When having acquired the measurement result, the control unit 32 proceeds to the process of step S502.

The control unit 32 estimates an interaction between real physical bodies (step S502). For example, the control unit 32 specifies the positional relationship between the recognized physical bodies and stores, in the storage unit 31, a result of estimating the interaction between the physical bodies based on the first information 31A for each of the physical body objects R. For example, in a case where there is no occurrence of interaction between the physical bodies, the control unit 32 stores a result indicating the impossibility of estimation of interaction in the storage unit 31. After storing the estimation result in the storage unit 31, the control unit 32 proceeds to the process of step S503.

The control unit 32 determines whether there is an interaction based on the estimation result of step S502 (step S503). When having determined that there is no interaction (No in step S503), the control unit 32 proceeds to a process of specifying an interaction in step S60 illustrated in FIG. 3 to be described below (step S504). When having determined that there is an interaction (Yes in step S503), the control unit 32 proceeds to the process of step S505.

The control unit 32 evaluates the interaction between real physical bodies (step S505). For example, using a result of simulation, machine learning, and the like, the control unit 32 evaluates the interaction based on the degree of deformation of the physical body due to the presence or absence of the interaction. For example, the control unit 32 evaluates the interaction based on the degree of deformation of the physical body by using the shape of the part having no interaction in an identical physical body. Furthermore, the control unit 32 may acquire a similar 3D model from the 3D model DB 314 and evaluate the interaction using the acquired 3D model.

Figure 11:
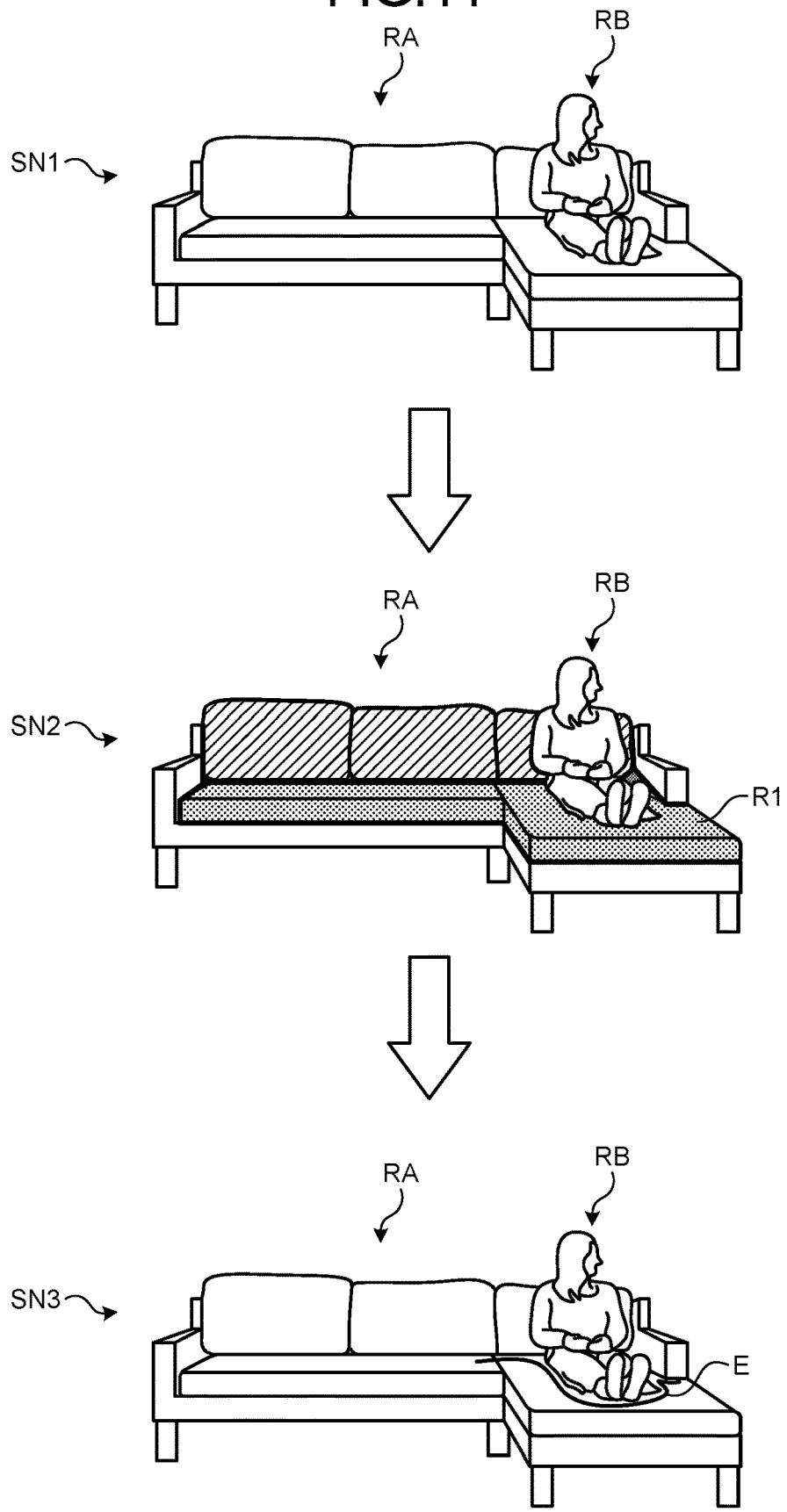
FIG. 11 is a diagram illustrating an example in which the information processing device evaluates an interaction between physical bodies.

FIG. 11 is a diagram illustrating an example in which the information processing device 30 evaluates an interaction between physical bodies. In a scene SN1 illustrated in FIG. 11, based on a measurement result, the control unit 32 recognizes a physical body object RA being a sofa and a physical body object RB being a human sitting on the physical body object RA. Subsequently, in a scene SN2, the control unit 32 recognizes a seat R1 of the physical body object RA by a process of recognizing the physical body. In a scene SN3, the control unit 32 evaluates the physical properties of the seat R1 of the physical body object RA based on a deformation amount E of the portion of the seat R1 of the physical body object RA on which the physical body object RA is sitting and the mass of the physical body object RB. Note that the mass of the physical body object RB includes, for example, the mass predicted from the size, the mass (weight) of the recognized individual, and the like. The control unit 32 stores the evaluation result in the storage unit 31.

Returning to FIG. 10, when having stored the evaluation result in the storage unit 31, the control unit 32 proceeds to a process of correcting the physical properties in step S51 illustrated in FIG. 3 (step S506).

Returning to FIG. 3, the control unit 32 executes the process of correcting physical properties (step S51). For example, there is a possibility that the recognition result of the physical body includes an error. Therefore, the control unit 32 corrects the physical properties so as to approach the deformation amount obtained in the evaluation of the interaction between the real physical bodies, for example. After correcting the first information 31A of the physical body based on the evaluation result, the control unit 32 proceeds to the process of step S60. The control unit 32 executes the process of step S51, thereby functioning as the correction unit 325A described above.

The control unit 32 executes a process of specifying an interaction (step S60). For example, the control unit 32 specifies an arrangement of the object C in the virtual space V so that the arrangement is capable of expressing the interaction with the physical body object based on the arrangement condition 31C of the object C and on the first information 31A. Note that the control unit 32 executes the process of step S60, thereby functioning as the specifying unit 326 described above.

Figure 12:
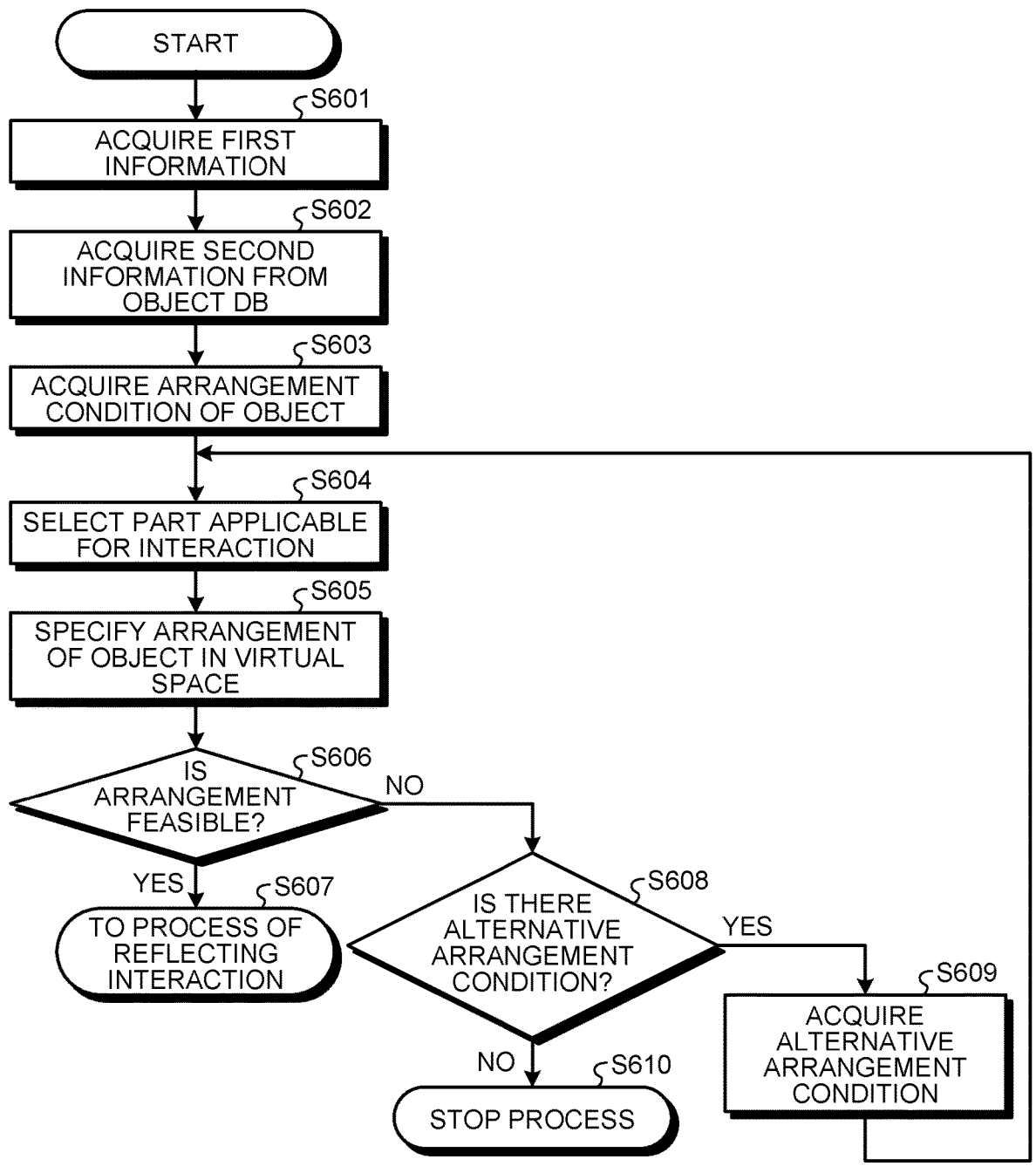
FIG. 12 is a flowchart illustrating an example of a processing procedure of specifying an interaction executed by the information processing device according to the first embodiment.

FIG. 12 is a flowchart illustrating an example of a processing procedure of specifying an interaction executed by the information processing device 30 according to the first embodiment. The processing procedure illustrated in FIG. 12 is implemented by execution of the process of step S60 by the control unit 32. As illustrated in FIG. 12, the control unit 32 acquires the first information 31A (step S601). For example, the control unit 32 acquires the first information 31A of the physical body object R being recognized. The control unit 32 acquires the second information 31B from the object DB 315 (step S602). For example, the control unit 32 acquires, from the object DB 315, the second information 31B including information regarding the structure and physical properties of the object C to be displayed. The control unit 32 acquires the arrangement condition 31C of the object C (step S603). For example, the control unit 32 acquires the arrangement condition 31C for expressing the interaction of the object C from the interaction DB 316. After completion of the process of step S603, the control unit 32 proceeds to the process of step S604.

Although the processing procedure illustrated in FIG. 12 illustrates a procedure of executing the processing in the order of steps S601, S602, and S603, the processing procedure illustrated in FIG. 12 is not limited to this order. The processing procedure in FIG. 12 may be performed in an order changed from the order of steps S601, S602, and S603, may be simultaneously performed, or may be performed as one process.

The control unit 32 selects a part applicable for interaction (step S604). For example, the control unit 32 selects a part that can express the interaction between the physical body and the object C based on the acquired arrangement condition 31C. For example, in a case where the arrangement condition 31C is "sitting down", the control unit 32 selects a part of a physical body on which the object C can sit down, and selects a part of the object C in a case where the object C sits down. After completion of the process of step S604, the control unit 32 proceeds to the process of step S605.

The control unit 32 specifies an arrangement of the object C in the virtual space V (step S605). For example, the control unit 32 specifies an optimum arrangement of the object C in the virtual space V so as to satisfy the arrangement condition 31C based on the selected part of the physical body and the part of the object C. For example, the control unit 32 specifies the arrangement of the object C based on a physical constraint between the physical body and the object C. The physical constraint includes constraints such as physical contact, collision, and load capacity of the physical body, for example. For example, the control unit 32 specifies an arrangement that satisfies the arrangement condition 31C based on the positional relationship between the physical body and the object C in the virtual space V. For example, the control unit 32 specifies an arrangement that is capable of expressing the characteristic (personality) of the object C and that satisfies the arrangement condition 31C. After having stored the specified result in the storage unit 31, the control unit 32 proceeds to the process of step S606.

The control unit 32 determines whether the arrangement is feasible based on the specifying result of step S605 (step S606). For example, in a case where the specifying result indicates that the arrangement has been successfully specified, the control unit 32 determines that the arrangement is feasible. When determining that the arrangement is feasible (Yes in step S606), the control unit 32 proceeds to the process of reflecting the interaction in step S70 illustrated in FIG. 3 to be described below (step S607). When having determined that the arrangement is not feasible (No in step S606), the control unit 32 proceeds to the process of step S608.

The control unit 32 determines whether there is an alternative arrangement condition 31C (step S608). For example, in a case where another arrangement condition 31C of the object C exists in the interaction DB 316, the control unit 32 determines that there is an alternative arrangement condition 31C. When having determined that there is an alternative arrangement condition 31C (Yes in step S608), the control unit 32 proceeds to the process of step S609. The control unit 32 acquires the alternative arrangement condition 31C (step S609). When having acquired the alternative arrangement condition 31C, the control unit 32 returns to the process of step S604 already described, and continues the processes of step S604 and subsequent steps. That is, the control unit 32 executes the processes from step S604 to step S606 related to the alternative arrangement condition 31C.

When having determined that there is no alternative arrangement condition 31C (No in step S608), the control unit 32 cannot arrange the object C in the virtual space V, and thus stops the process (step S610).

Figure 13:
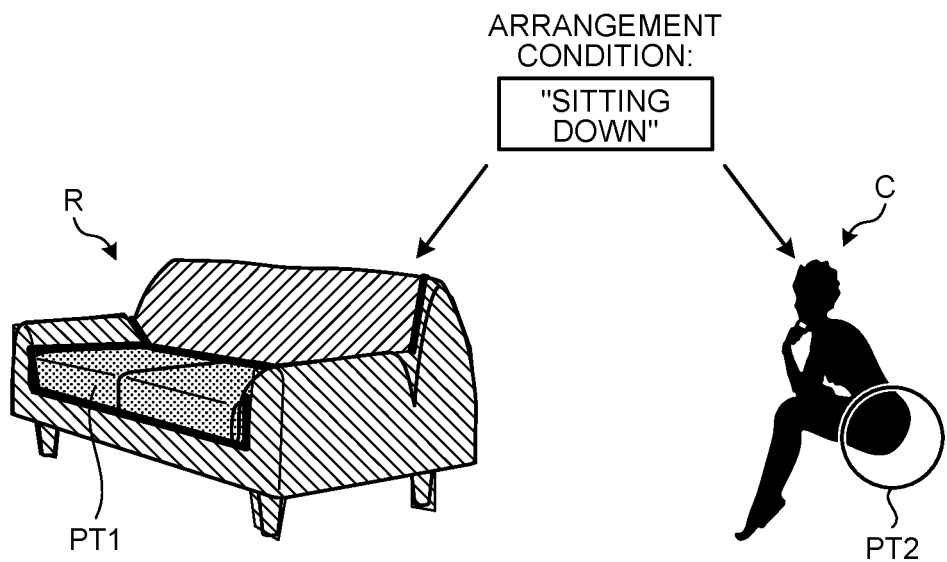
FIG. 13 is a diagram illustrating an example in which the information processing device specifies an arrangement of a physical body.

FIG. 13 is a diagram illustrating an example in which the information processing device 30 specifies an arrangement of a physical body. As illustrated in FIG. 13, the control unit 32 recognizes a physical body object R being a sofa. The control unit 32 recognizes that the arrangement condition 31C for the object C is "sitting down". In this case, the control unit 32 selects the seat R1 of the physical body object R as a part PT1 of the physical body object R, and selects the buttocks of the object C in the sitting posture as a part PT2. When the part PT2 of the object C can be arranged at the part PT1 of the physical body object R, the control unit 32 specifies the position in the virtual space V corresponding to the part PT1 of the physical body object R as the arrangement of the object C.

Furthermore, in a case where the part PT2 of the object C cannot be arranged at the part PT1 of the physical body object R due to the positional relationship of the physical body object R with another physical body, the control unit 32 acquires an alternative arrangement condition 31C. For example, here, the alternative arrangement condition 31C is "lying". In this case, the control unit 32 selects the seat R1 of the physical body object R as a part PT1 of the physical body object R, and selects the abdomen, legs, and the like of the object C in the lying posture as a part. When the part of the object C can be arranged at the part PT1 of the physical body object R, the control unit 32 specifies the position in the virtual space V corresponding to the part PT1 of the physical body object R as the arrangement of the object C.

Returning to FIG. 3, when the process of step S60 is completed, the control unit 32 executes a process of reflecting the interaction (step S70). For example, the control unit 32 executes a process of expressing an interaction between the physical body object R and the object C based on the specified arrangement of the object C in the virtual space V. Note that the control unit 32 executes the process of step S70, thereby functioning as the processing unit 327 described above.

Figure 14:
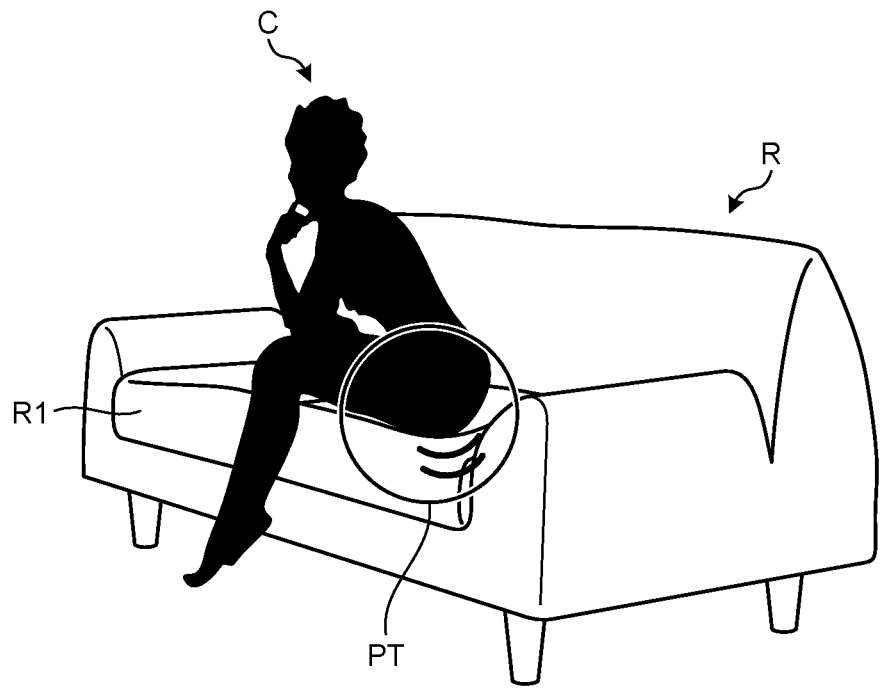
FIG. 14 is a diagram illustrating an example in which the information processing device expresses an interaction between a physical body object and an object.

FIG. 14 is a diagram illustrating an example in which the information processing device 30 expresses an interaction between the physical body object R and the object C. As illustrated in FIG. 14, the control unit 32 arranges the object C such that the part PT2 of the object C comes in contact with the part PT1 of the seat R1 of the physical body object R. In this case, the control unit 32 determines an expression of sinking as an interaction in a portion of the part PT1 of the physical body object R with which the part PT2 comes in contact. For example, the control unit 32 calculates the amount of sink in the part PT2 of the physical body object R based on the physical properties of the physical body object R and the weight of the object C. As a result, the control unit 32 stores, in the storage unit 31, a processing result including position information indicating the position of individual parts of the object C in the virtual space V and deformation information indicating the amount of deformation and the like in the part PT2 of the physical body object R.

Returning to FIG. 3, the control unit 32 executes a process of controlling display on the display device 20 (step S80). For example, the control unit 32 controls to create a VR image based on the processing result and the map information 31M and display the created VR image on the display device 20. As a result, the display device 20 displays a VR image expressing the interaction between the physical body object R obtained by capturing the real environment into the virtual space, and the object C. Note that the control unit 32 executes the process of step S80, thereby functioning as the display control unit 328 described above. After completion of the process of step S80, the control unit 32 finishes the processing procedure illustrated in FIG. 3.

As described above, after capturing a real physical body into the virtual space V as the physical body object R, the information processing device 30 according to the first embodiment recognizes the first information 31A indicating the structure and physical properties of the physical body object R and stores the first information 31A in the storage unit 31. The information processing device 30 specifies an arrangement of the object C representing a virtual object in the virtual space V so that the arrangement is capable of expressing the interaction with the physical body object R based on the arrangement condition 31C of the object C and on the first information 31A.

For example, as illustrated in FIG. 14, in a case where the physical body object R is a sofa and the arrangement condition 31C of the object C is "sitting down", the information processing device 30 specifies the seat portion of the sofa in the virtual space V as a position where the object C can be arranged. With this configuration, by arranging the object C at a position where the object C can interact with the physical body object R in the virtual space V into which the real environment has been captured, the information processing device 30 can suppress a gap occurring between the physical body object R and the object C in the virtual space V. As a result, the information processing device 30 can suppress the strangeness or incompatibility of the object C displayed in the virtual space V into which the measured real environment has been captured.

Furthermore, the information processing device 30 specifies an arrangement of the object C in the virtual space V so that the arrangement satisfies physical conditions between the part of the object C and the physical body object R corresponding to the arrangement condition 31C and so that the arrangement is capable of expressing the interaction with the physical body object R. With this configuration, the information processing device 30 specifies an arrangement of the object C in the virtual space V so that the arrangement satisfies the physical condition between the part of the object C and the physical body object R, making it possible to arrange the object C at an appropriate position in the virtual space where the interaction can be expressed. As a result, the information processing device 30 can achieve natural expression of the interaction between the physical body object R and the object C.

Second Embodiment

Outline of Display System According to Second Embodiment

Figure 15:
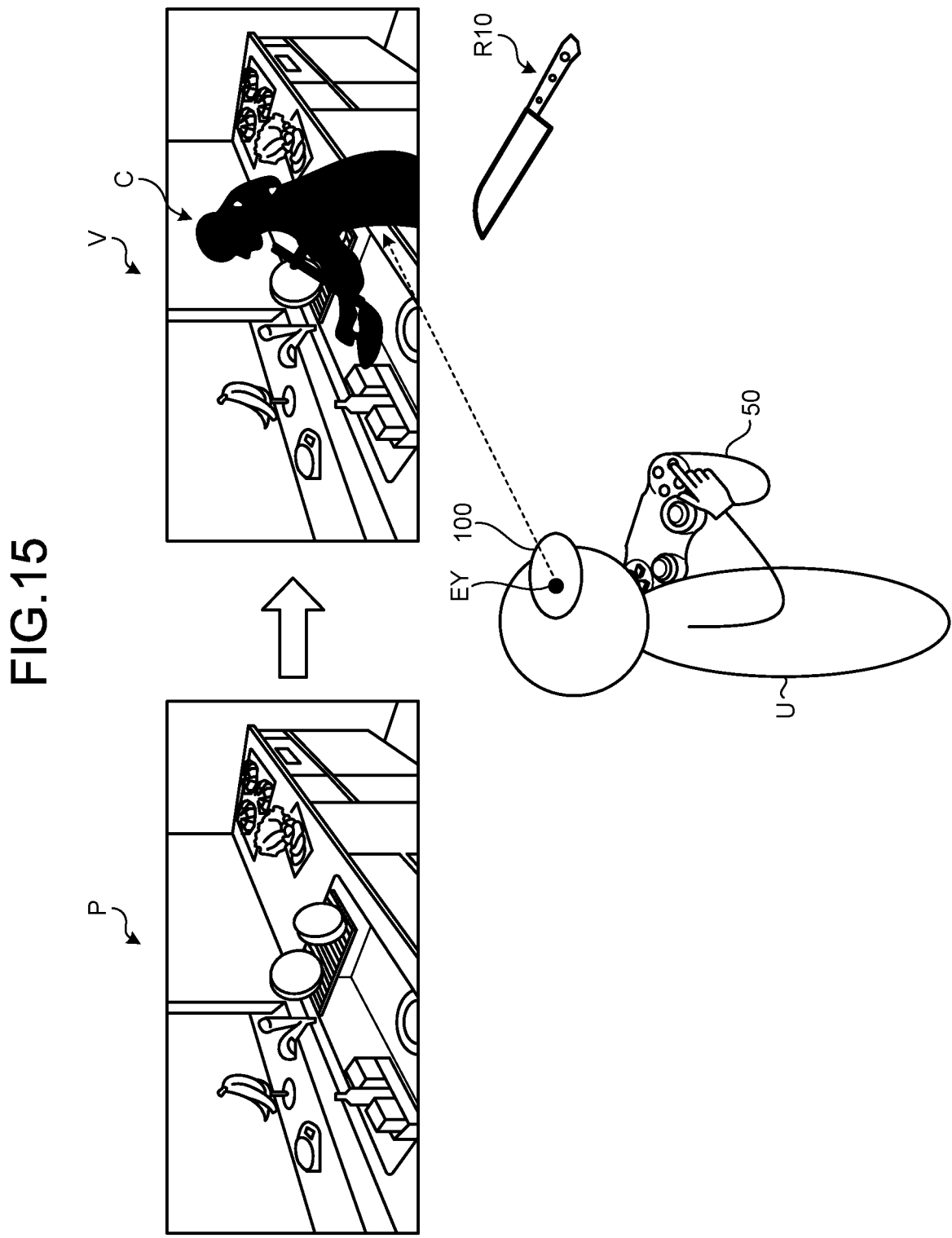
FIG. 15 is a diagram illustrating an example of a display system according to a second embodiment.

FIG. 15 is a diagram illustrating an example of a display system according to a second embodiment. A display system 100 illustrated in FIG. 15 includes a sensor unit 10, a display device 20, and an information processing device 30, similarly to the display system 100 of the first embodiment. Note that description of the configuration similar to the display system 100 according to the first embodiment will be omitted. The display system 100 is mounted on the head of a user U, and displays, on the display device 20, an image of a virtual space V into which a measured real environment P has been captured, under the control of the information processing device 30. With this configuration, the user U recognizes the virtual space V displayed in front of eyes EY.

The display system 100 is capable of wirelessly communicating with an operation input unit 50. The operation input unit 50 has a function of inputting an operation of the user U, for example. The operation input unit 50 includes, for example, input devices such as a controller of a game machine, a hardware button, and a touch panel. The operation input unit 50 transmits information indicating the operation result of the user U to the display system 100. Note that the operation input unit 50 may transmit information to the display system 100 via a game machine, for example. The operation input unit 50 may be formed integrally with the display system 100.

The information processing device 30 includes a storage unit 31 and a control unit 32. The control unit 32 includes functional units such as a measurement unit 321, a first recognition unit 322, a second recognition unit 323, a missing defect detection unit 324, an estimation unit 325, a specifying unit 326, a processing unit 327, and a display control unit 328.

Figure 16:
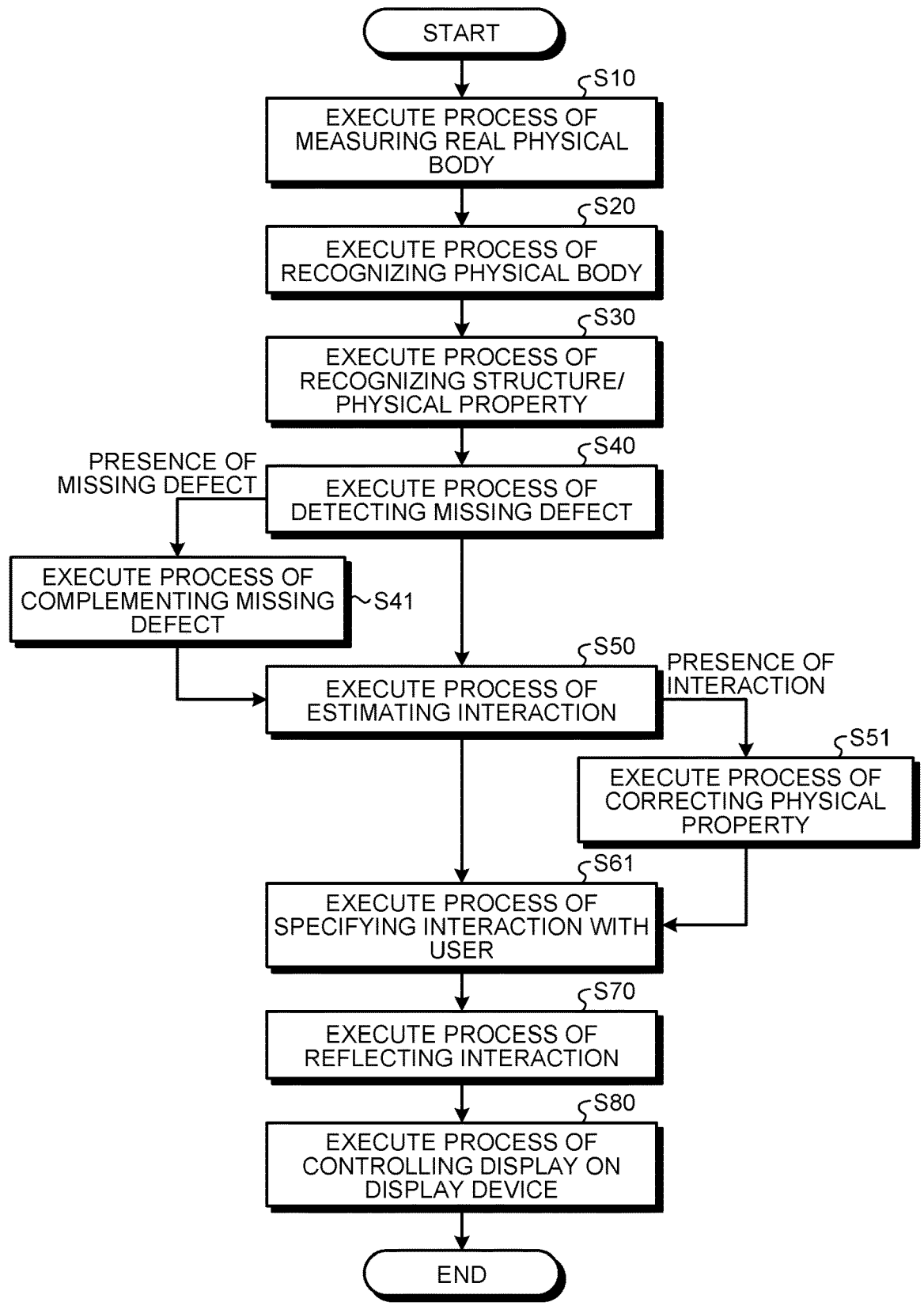
FIG. 16 is a flowchart illustrating an example of a processing procedure executed by an information processing device according to the second embodiment.

In an example illustrated in FIG. 15, the information processing device 30 provides a function of capturing a real environment P in a kitchen into the virtual space V and virtually cooking in accordance with the operation of the operation input unit 50 by the user U. For example, the information processing device 30 arranges the object C in the virtual space V, and displays an image in which the object C performs cooking using a physical body object R10 on the display device 20. The physical body object R10 includes a physical body used for cooking, such as a kitchen knife, a smaller knife, a cutting board, a sink, a cooking stove, a frying pan, and a pot, for example, Processing Procedure of Information Processing Device According to Second Embodiment Next, an example of a processing procedure of the information processing device 30 according to the second embodiment will be described. FIG. 16 is a flowchart illustrating an example of a processing procedure executed by the information processing device 30 according to the second embodiment. The processing procedure illustrated in FIG. 16 is actualized by execution of a program by the control unit 32 of the information processing device 30. The processing procedure illustrated in FIG. 16 is repeatedly executed by the control unit 32.

As illustrated in FIG. 16, the control unit 32 of the information processing device 30 executes a process of measuring a real physical body (step S10). For example, the control unit 32 stores measurement information indicating a real physical body in the real environment P in the storage unit 31 based on sensor information of the sensor unit 10. After completion of the process of step S10, the control unit 32 proceeds to the process of step S20.

The control unit 32 executes a process of recognizing a physical body (step S20). For example, the control unit 32 recognizes a physical body to be used in cooking in the real environment P based on the measurement information and the physical body recognition model 311. After completion of the process of step S20, the control unit 32 proceeds to the process of step S30.

The control unit 32 executes a process of recognizing the structure and physical properties (step S30). For example, the control unit 32 searches for a model that matches or resembles the recognized physical body from among the models of the structure/physical property model 312, and recognizes the structure and physical properties indicated by the model as the structure and physical properties of the physical body. For example, when having recognized that the physical body object R10 is a kitchen knife, the control unit 32 recognizes that the physical body object R10 has a blade and a handle. For example, the control unit 32 recognizes that the blade of the physical body object R10 has a cutting ability and the handle has high rigidity. After completion of the process of step S30, the control unit 32 proceeds to the process of step S40.

The control unit 32 executes a process of detecting a missing defect (step S40). In a case where there is a missing defect, the control unit 32 executes the process of complementing the missing defect in step S41 and then proceeds to the process of step S50. In addition, in a case where there is no missing defect, the control unit 32 proceeds to the process of step S50.

The control unit 32 executes a process of estimating interaction (step S50). For example, the control unit 32 specifies the positional relationship between the recognized physical bodies in the kitchen and estimates the interaction between the physical bodies based on the first information 31A for each of the physical body objects R. In a case where there is interaction, the control unit 32 executes the process of correcting the physical properties in step S51 and proceeds to the process of step S61. Furthermore, in a case where there is no interaction, the control unit 32 proceeds to the process of step S61.

The control unit 32 executes a process of specifying interaction with the user (step S61). For example, the control unit 32 specifies an arrangement of the object C in the virtual space V so that the arrangement is capable of expressing the interaction with the physical body object based on the arrangement condition 31C of the object C operated by the user and on the first information 31A. For example, in a case where the arrangement condition 31C is "applying a kitchen knife to an ingredient", the control unit 32 specifies an arrangement in the virtual space V so that the arrangement is capable of expressing an interaction between two physical body objects R, namely, the ingredient and the kitchen knife, and the object C. After completion of the process of step S60, the control unit 32 proceeds to the process of step S70.

The control unit 32 executes a process of reflecting an interaction (step S70). For example, the control unit 32 executes a process of expressing an interaction between the physical body object R and the object C based on the specified arrangement of the object C in the virtual space V. For example, the control unit 32 executes a process of expressing an interaction occurring among the plurality of physical body objects R in the virtual space V based on a plurality of pieces of first information 31A and the motion of the object C. For example, in a case where the arrangement condition 31C is "applying a kitchen knife to an ingredient", the control unit 32 executes a process of expressing deformation and cutting of the ingredient by the interaction between the ingredient and the kitchen knife by applying the kitchen knife to the ingredient. Furthermore, the control unit 32 may execute a process of providing the user U with the weight of the physical body object R by a vibration function or the like of the operation input unit 50 as the interaction between the physical body object R and the object C. Furthermore, in a case where the object C touches a dangerous part of the physical body object R, the control unit 32 may execute a process of notifying the user U of danger as the interaction between the physical body object R and the object C. After completion of the process of step S70, the control unit 32 proceeds to the process of step S80.

The control unit 32 executes a process of controlling display on the display device 20 (step S80). For example, the control unit 32 controls to create a VR image based on the processing result and the map information 31M and display the created VR image on the display device 20. As a result, the display device 20 displays a VR image expressing the interaction in which the object C performs cooking using the physical body objects R obtained by capturing the real environment into the virtual space. After completion of the process of step S80, the control unit 32 finishes the processing procedure illustrated in FIG. 16.

As described above, the information processing device 30 according to the second embodiment executes the process of expressing the interaction occurring between the plurality of physical body objects R in the virtual space V based on the plurality of pieces of first information 31A and the motion of the object C.

For example, in the virtual space V illustrated in FIG. 15, it is assumed that the physical body object R10 is a kitchen knife, and the arrangement condition 31C of the object C is "applying a kitchen knife to an ingredient". In this case, the information processing device 30 expresses an interaction in which the kitchen knife cuts the ingredient in the virtual space V based on the first information 31A regarding the ingredient and the motion of the object C in the virtual space V. As a result, by recognizing tools, ingredients, facilities, and the like in the real environment as physical bodies, the information processing device 30 can provide the user with virtual cooking in the virtual space V, leading to an effective use of the live-action VR.

The above-described second embodiment is an example, and various modifications and applications are possible. The information processing device 30 of the second embodiment may be applied to other embodiments and the like.

Third Embodiment

Outline of Display System According to Third Embodiment

Figure 17:
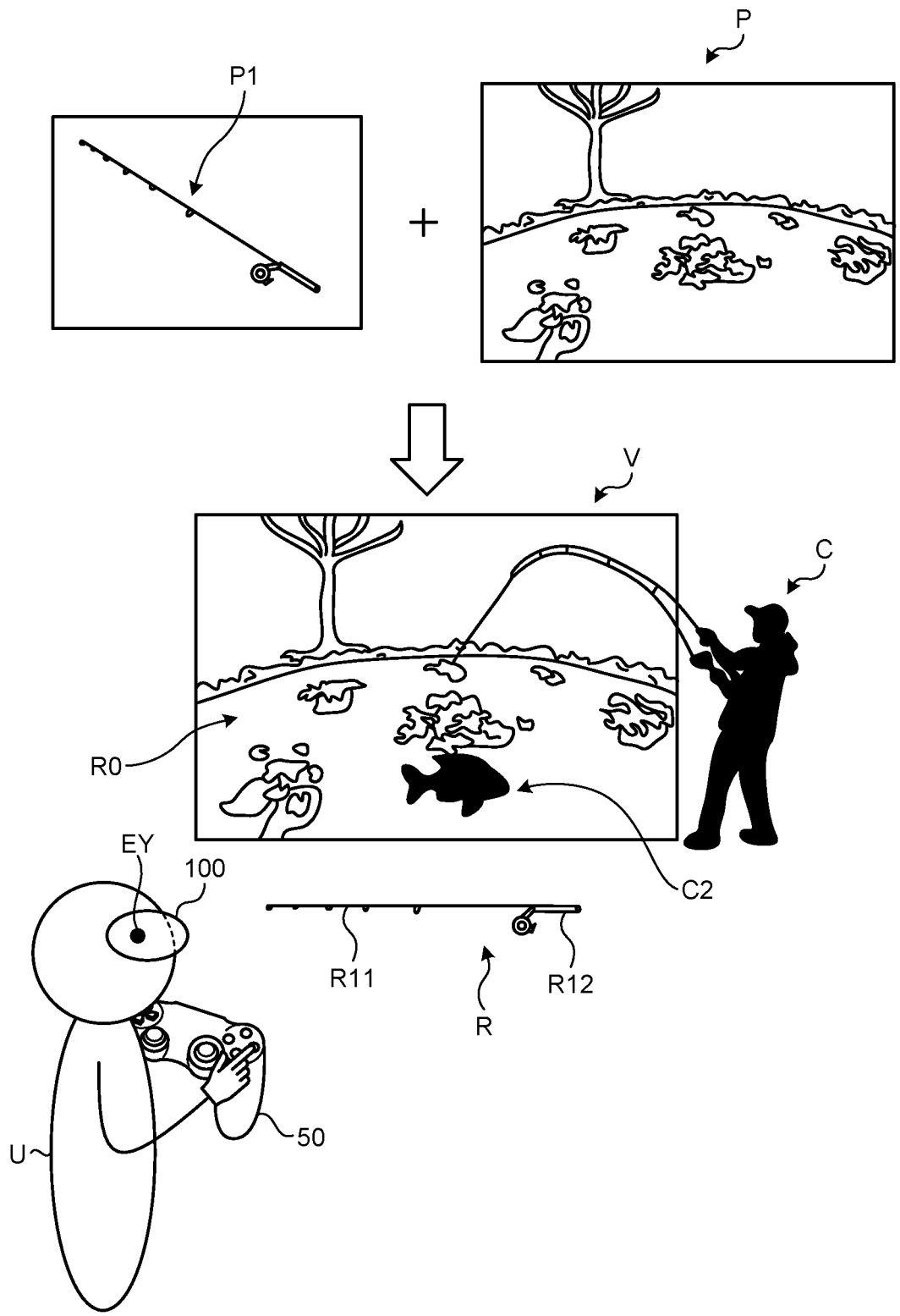
FIG. 17 is a diagram illustrating an example of a display system according to a third embodiment.

FIG. 17 is a diagram illustrating an example of a display system according to a third embodiment. Similarly to the display system 100 of the first embodiment, a display system 100 illustrated in FIG. 17 includes a sensor unit 10, a display device 20, and an information processing device 30. Note that description of the configuration similar to the display system 100 according to the first and second embodiments will be omitted. The display system 100 is mounted on the head of a user U, and displays, on the display device 20, an image of a virtual space V into which a measured real environment P has been captured, under the control of the information processing device 30. With this configuration, the user U recognizes the virtual space V displayed in front of eyes EY.

The information processing device 30 includes a storage unit 31 and a control unit 32. The control unit 32 includes functional units such as a measurement unit 321, a first recognition unit 322, a second recognition unit 323, a missing defect detection unit 324, an estimation unit 325, a specifying unit 326, a processing unit 327, and a display control unit 328.

In an example illustrated in FIG. 17, the information processing device 30 provides a function of capturing a real environment P including a fishing rod P1 and a pond into the virtual space V and virtually fishing in accordance with the operation of the operation input unit 50 by the user U. For example, the information processing device 30 arranges the object C in the virtual space V, and displays an image for which the object C performs fishing using a physical body object R on the display device 20. The physical body object R is a fishing rod.

Figure 18:
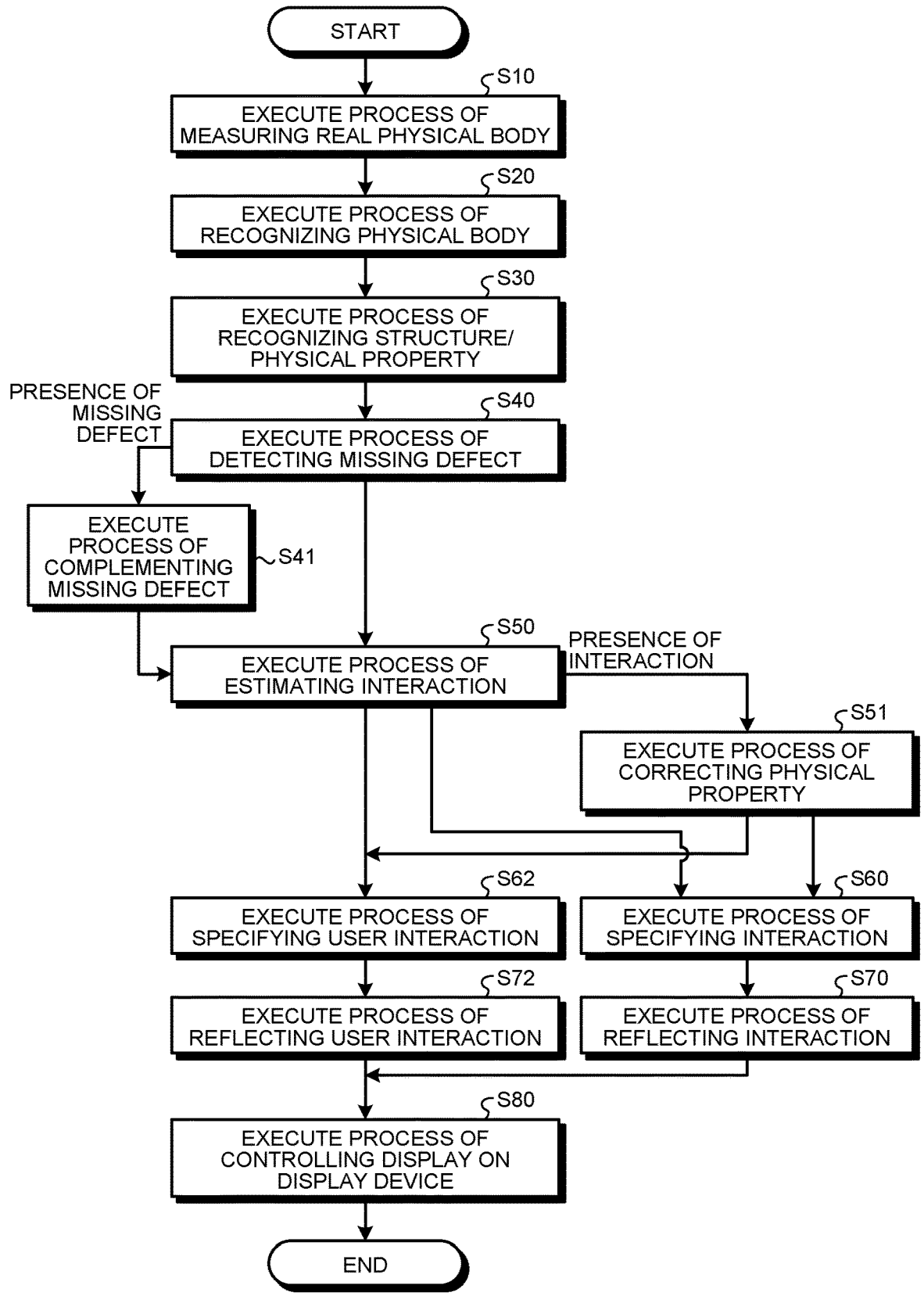
FIG. 18 is a flowchart illustrating an example of a processing procedure executed by an information processing device according to the third embodiment.

Processing Procedure of Information Processing Device According to Third Embodiment Next, an example of a processing procedure of the information processing device 30 according to the third embodiment will be described. FIG. 18 is a flowchart illustrating an example of a processing procedure executed by the information processing device 30 according to the third embodiment. The processing procedure illustrated in FIG. 18 is actualized by execution of a program by the control unit 32 of the information processing device 30 The processing procedure illustrated in FIG. 18 is repeatedly executed by the control unit 32.

As illustrated in FIG. 18, the control unit 32 of the information processing device 30 executes a process of measuring a real physical body (step S10). For example, the control unit 32 stores measurement information indicating a real physical body in the real environment P in the storage unit 31 based on sensor information of the sensor unit 10. The control unit 32 may simultaneously measure or separately measure the real environment P and the fishing rod P1 being a physical body. After completion of the process of step S10, the control unit 32 proceeds to the process of step S20.

The control unit 32 executes a process of recognizing a physical body (step S20). For example, the control unit 32 recognizes the pond and the fishing rod P1 being the real environment P based on the measurement information and the physical body recognition model 311. After completion of the process of step S20, the control unit 32 proceeds to the process of step S30.

The control unit 32 executes a process of recognizing the structure and physical properties (step S30). For example, the control unit 32 searches for a model that matches or resembles the recognized physical body from among the models of the structure/physical property model 312, and recognizes the structure and physical properties indicated by the model as the structure and physical properties of the physical body. For example, in an example illustrated in FIG. 17, when having recognized that a physical body object R0 in the real environment P is a pond, the control unit 32 recognizes that the physical property of the physical body object R0 is water. For example, when having recognized that the physical body object R is a fishing rod, the control unit 32 recognizes that the physical body object R has a tip R11 and a rod R12. For example, the control unit 32 recognizes a physical property that the tip R11 has high flexibility and the rod R12 has high rigidity in the physical body object R. Returning to FIG. 18, when having completed the process of step S30, the control unit 32 proceeds to the process of step S40.

The control unit 32 executes a process of detecting a missing defect (step S40). In a case where there is a missing defect, the control unit 32 executes a process of complementing the missing defect in step S41 and then proceeds to the process of step S50. In addition, in a case where there is no missing defect, the control unit 32 proceeds to the process of step S50.

The control unit 32 executes a process of estimating interaction (step S50). For example, the control unit 32 specifies the positional relationship between the recognized physical properties, and estimates the interaction between the physical bodies based on the first information 31A for each of the physical body objects R and R0. In a case where there is interaction, the control unit 32 executes a process of correcting the physical properties in step S51, and then proceeds to the process of steps S60 and S62. In addition, in a case where there is no interaction, the control unit 32 proceeds to the process of steps S60 and S62.

The control unit 32 executes a process of specifying an interaction (step S60). For example, the control unit 32 specifies an arrangement of the object C in the virtual space V so that the arrangement is capable of expressing the interaction with the physical body object based on the arrangement condition 31C of the object C and on the first information 31A. For example, when the arrangement condition 31C is "fishing", the control unit 32 specifies the arrangement of the object C in the virtual space V so that the object C is located at an edge of a pond or the like.

Furthermore, the control unit 32 specifies an arrangement of an object C2 in the virtual space V based on the arrangement condition 31C of the object C2 operable by the object C and on the first information 31A. The object C2 is an example of a third object. The storage unit 31 stores the arrangement condition 31C of the third object. For example, in a case where the third object is "fish", the arrangement condition 31C indicates a condition for arrangement in water. In the virtual space V illustrated in FIG. 17, the control unit 32 specifies the arrangement of the object C in the virtual space V such that the object C2 being a fish is positioned in a pond. After completion of the process of step S60, the control unit 32 proceeds to the process of step S70.

The control unit 32 executes a process of reflecting an interaction (step S70). For example, the control unit 32 executes a process of expressing an interaction between the physical body object R and the object C based on the specified arrangement of the object C in the virtual space V. For example, the control unit 32 executes processes of expressing the interaction when arranging the object C to stand on an edge of the pond in the virtual space V and arranging the object C2 in the pond. Since the object C2 is fish, the control unit 32 executes processes of expressing an interaction represented by the movement of the object C2 toward a bait after the bait is thrown into the pond, or the movement of the object C2 being caught when the user lifts the fishing rod at an appropriate timing, for example. After completion of the process of step S70, the control unit 32 proceeds to the process of step S80.

As another flow, the control unit 32 executes a process of specifying the interaction of the user U (step S62). For example, the control unit 32 specifies the interaction among the physical body object R, the object C, and the object C2 based on the first information 31A of the physical body object R and the position information of the object C2. For example, the control unit 32 specifies an interaction related to the mass of the fishing rod to be fed back to the user U. Note that the control unit 32 executes the process of step S62, thereby functioning as the specifying unit 326 described above. After completion of the process of step S62, the control unit 32 proceeds to the process of step S72.

The control unit 32 executes a process of reflecting the interaction of the user U (step S72). For example, the control unit 32 executes a process of expressing an interaction between the physical body object R and another object in the specified virtual space V. For example, the control unit 32 executes a process of providing the user U with the weight of the physical body object R by the vibration function or the like of the operation input unit 50 as the interaction between the physical body object R and the other object. Note that the control unit 32 executes the process of step S72, thereby functioning as the processing unit 327 described above. After completion of the process of step S72, the control unit 32 proceeds to the process of step S80.

The control unit 32 executes a process of controlling display on the display device 20 (step S80). For example, the control unit 32 controls to create a VR image based on the processing result and the map information 31M and display the created VR image on the display device 20. As a result, the display device 20 displays a VR image expressing the interaction in which the object C performs fishing using the physical body object R obtained by capturing the real environment into the virtual space. After completion of the process of step S80, the control unit 32 finishes the processing procedure illustrated in FIG. 18.

As described above, the information processing device 30 according to the third embodiment specifies arrangement of the object C2 in the virtual space V based on the arrangement condition 31C of the object C2 operable by the object C and on the first information 31A. The information processing device 30 executes the process of expressing an interaction occurring between the object C2 and the physical body object R based on a characteristic of the object C2 and on the first information 31A.

For example, in the virtual space V illustrated in FIG. 17, it is assumed that the physical body object R is a fishing rod and the arrangement condition 31C of the object C is "fishing". In this case, the information processing device 30 expresses an interaction in the case of fishing in the virtual space V based on the object C2 indicating a fish in the virtual space V and the first information 31A regarding the fishing rod. As a result, by recognizing the fishing rod in the real environment as a physical body, the information processing device 30 can provide the user with virtual fishing in the virtual space V, leading to an effective use of the live-action VR.

The above-described third embodiment is an example, and various modifications and applications are possible. The information processing device 30 of the third embodiment may be applied to other embodiments and the like.

[Hardware Configuration]

Figure 19:
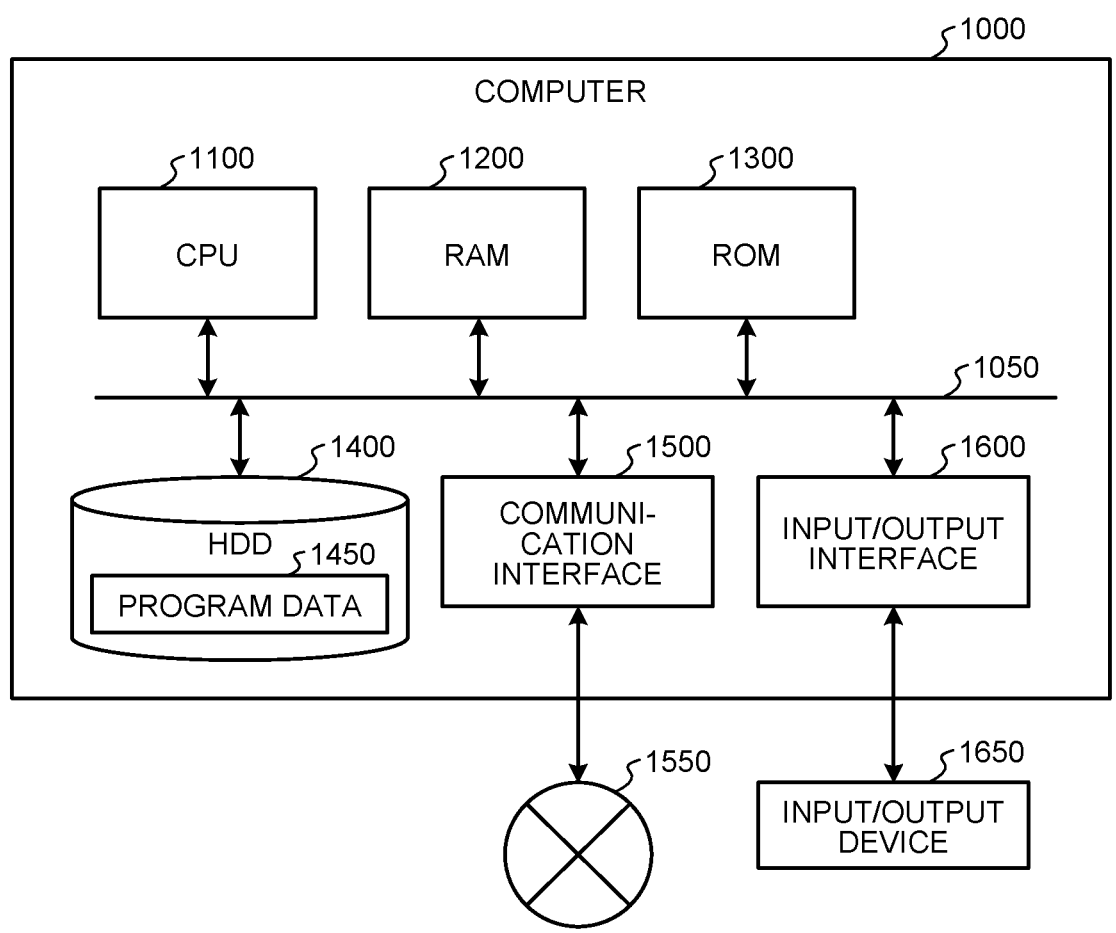
FIG. 19 is a hardware configuration diagram illustrating an example of a computer that actualizes functions of an information processing device.

The information processing device 30 according to the present embodiment described above may be actualized by a computer 1000 having a configuration as illustrated in FIG. 19, for example. Hereinafter, the information processing device 30 according to an embodiment will be described as an example. FIG. 19 is a hardware configuration diagram illustrating an example of the computer 1000 that actualizes functions of the information processing device 30. The computer 1000 includes a CPU 1100, a RAM 1200, a read only memory (ROM) 1300, a hard disk drive (HDD) 1400, a communication interface 1500, and an input/output interface 1600. Individual components of the computer 1000 are interconnected by a bus 1050.

The CPU 1100 operates based on a program stored in the ROM 1300 or the HDD 1400 so as to control each of components. For example, the CPU 1100 develops a program stored in the ROM 1300 or the HDD 1400 into the RAM 1200 and executes processes corresponding to various programs.

The ROM 1300 stores a boot program such as a basic input output system (BIOS) executed by the CPU 1100 when the computer 1000 starts up, a program dependent on hardware of the computer 1000, or the like.

The HDD 1400 is a non-transitory computer-readable recording medium that records a program executed by the CPU 1100, data used by the program, or the like. Specifically, the HDD 1400 is a recording medium that records an information processing program according to the present disclosure, which is an example of program data 1450.

The communication interface 1500 is an interface for connecting the computer 1000 to an external network 1550 (for example, the Internet). For example, the CPU 1100 receives data from other devices or transmits data generated by the CPU 1100 to other devices via the communication interface 1500.

The input/output interface 1600 is an interface for connecting between an input/output device 1650 and the computer 1000. For example, the CPU 1100 receives data from an input device such as a keyboard or a mouse via the input/output interface 1600. In addition, the CPU 1100 transmits data to an output device such as a display, a speaker, or a printer via the input/output interface 1600. Furthermore, the input/output interface 1600 may function as a media interface for reading a program or the like recorded on predetermined recording medium (or simply medium). Examples of the media include optical recording media such as a digital versatile disc (DVD), a magneto-optical recording medium such as a magneto-optical disk (MO), a tape medium, a magnetic recording medium, and semiconductor memory.

For example, in a case where the computer 1000 functions as the information processing device 30 according to the embodiment, the CPU 1100 of the computer 1000 executes the program loaded on the RAM 1200, thereby implementing the functions of the control unit 32, namely, functions of the measurement unit 321, the first recognition unit 322, the second recognition unit 323, the missing defect detection unit 324, the estimation unit 325, the specifying unit 326, the processing unit 327, the display control unit 328, and the like. The HDD 1400 stores the program and the data in the storage unit 31 according to the present disclosure. While the CPU 1100 executes the program data 1450 read from the HDD 1400, the CPU 1100 may acquire these programs from another device via the external network 1550, as another example.

The preferred embodiments of the present disclosure have been described in detail above with reference to the accompanying drawings. However, the technical scope of the present disclosure is not limited to such examples. It will be apparent to those skilled in the art of the present disclosure that various modifications and alterations can be conceived within the scope of the technical idea described in the claims and naturally fall within the technical scope of the present disclosure.

Furthermore, the effects described in the present specification are merely illustrative or exemplary and are not limited. That is, the technique according to the present disclosure can exhibit other effects that are apparent to those skilled in the art from the description of the present specification in addition to or instead of the above effects.

It is also possible to create a program for the hardware such as a CPU, ROM, and RAM built in a computer to exert the functions equivalent to the configuration of the information processing device 30, and a computer-readable recording medium that has recorded the program can also be provided.

Furthermore, individual steps related to the processing of the information processing device 30 in the present specification do not necessarily have to be processed in chronological order in the order described in the flowchart. For example, individual steps related to the processing of the information processing device 30 may be processed in an order different from the order described in the flowchart, or may be processed in parallel.

(Effects)

The information processing device 30 includes: the storage unit 31 that stores the first information 31A indicating at least one of a structure or a physical property of a first object obtained by capturing a real physical body into a virtual space; and the specifying unit 326 that specifies an arrangement of a second object indicating a virtual object in the virtual space V so that the arrangement is capable of expressing an interaction with the first object based on the arrangement condition 31C of the second object and on the first information 31A.

With this configuration, by arranging the second object at a position where the second object can interact with the first object in the virtual space V into which the real environment has been captured, the information processing device 30 can suppress a gap occurring between the first object and the second object in the virtual space V. As a result, the information processing device 30 can suppress the strangeness or incompatibility of the second object displayed in the virtual space V into which the measured real environment has been captured.

The specifying unit 326 of the information processing device 30 specifies an arrangement of the second object in the virtual space V so that the arrangement satisfies physical conditions between a part of the second object and the first object corresponding to the arrangement condition 31C and so that the arrangement is capable of expressing the interaction with the first object.

With this configuration, the information processing device 30 specifies the arrangement of the second object in the virtual space V so as to satisfy the physical condition between the part of the second object and the first object, making it possible to arrange the second object at an appropriate position where the interaction can be expressed in the virtual space V. As a result, the information processing device 30 can achieve natural expression of the interaction between the first object and the second object in the virtual space V.

The specifying unit 326 of the information processing device 30 specifies an arrangement of the second object in the virtual space V so that the arrangement is capable of expressing the interaction with the first object based on the positional relationship of the components of the first object in the virtual space V.

With this configuration, the information processing device 30 specifies the arrangement of the second object in the virtual space V in consideration of the positional relationship of the components of the first object in the virtual space V, making it possible to arrange the second object at an appropriate position in the virtual space V where the interaction can be expressed. As a result, the information processing device 30 can arrange the second object in the component capable of expressing the interaction by the first object in the virtual space V, making it possible to achieve more natural expression of the interaction.

The specifying unit 326 of the information processing device 30 specifies an arrangement of the second object in the virtual space V so that the arrangement is capable of expressing the interaction with the first object based on the second information 31B indicating the characteristic of the second object, the arrangement condition 31C, and the first information 31A.

With this configuration, the information processing device 30 specifies the arrangement of the object C in the virtual space V in consideration of the characteristic of the second object in the virtual space V, making it possible to arrange the second object at an appropriate position in the virtual space V suitable for the characteristic of the second object and capable of expressing the interaction. As a result, the information processing device 30 can achieve natural expression of the interaction between the first object and the second object in the virtual space V without interfering with the expression of the characteristic of the second object in the virtual space V.

In the information processing device 30, in a case where it is not possible to specify an arrangement of the second object in the virtual space V so that the arrangement is capable of expressing the interaction with the first object, the specifying unit 326 specifies the arrangement of the second object based on another arrangement condition 31C different from the arrangement condition 31C.

With this operation, in a case where the second object cannot be arranged in the virtual space V so as to satisfy the arrangement condition 31C, the information processing device 30 can specify the arrangement of the second object so as to satisfy another arrangement condition 31C in the virtual space V. As a result, the information processing device 30 can prevent an occurrence of unnatural expression of the interaction between the first object and the second object in the virtual space V.

In the information processing device 30, in a case where the specifying unit 326 cannot specify an arrangement of the second object in the virtual space V so that the arrangement is capable of expressing the interaction with the first object, the second object is not to be arranged in the virtual space V.

With this operation, in a case where the second object cannot be arranged in the virtual space V so as to satisfy the arrangement condition 31C, the information processing device 30 can stop the arrangement of the second object in the virtual space V. As a result, the information processing device 30 can prevent an occurrence of unnatural expression of the interaction between the first object and the second object in the virtual space V.

The information processing device 30 further includes the processing unit 327 that executes the process of expressing an interaction between the first object and the second object based on the arrangement of the second object in the virtual space V specified by the specifying unit 326 and on the first information 31A.

With this configuration, the information processing device 30 can express an interaction between the first object and the second object based on the arrangement of the second object in the virtual space V and the structure and physical properties of the first object. As a result, the information processing device 30 can express the interaction with the second object in consideration of the structure and physical properties of the first object, making it possible to further suppress the strangeness or incompatibility of the second object displayed in the virtual space V.

The information processing device 30 further includes the second recognition unit 323 that generates the first information 31A based on the recognition result of recognizing the real physical body and on the information indicating the structure and physical properties, and the storage unit 31 stores the first information 31A generated by the second recognition unit 323.

With this configuration, the information processing device 30 can generate the first information 31A indicating the structure and physical properties of the first object obtained by capturing the real physical body into the virtual space V, and can store the first information 31A in the storage unit 31. As a result, by generating the first information 31A of the physical body captured in the virtual space V, the information processing device 30 can achieve natural expression of the interaction between the first object and the second object.

The information processing device 30 further includes: the missing defect detection unit 324 that detects a missing defect of a real physical body based on the first information 31A generated by the second recognition unit 323; and the missing defect complementing unit 324A that changes the first information 31A to complement a missing defect in a real physical body when the missing defect has been detected, and the storage unit 31 stores the first information 31A changed by the missing defect complementing unit 324A.

With this configuration, when having detected a missing defect in a real physical body based on the first information 31A, the information processing device 30 can change the first information 31A to complement the missing defect. As a result, by complementing the missing defect of the physical body captured into the virtual space V, the information processing device 30 can achieve more natural expression of the interaction between the first object and the second object.

The information processing device 30 further includes: the estimation unit 325 that estimates an interaction between the plurality of first objects based on the first information 31A generated by the second recognition unit 323; and the correction unit 325A that corrects the first information 31A based on the estimation result of the estimation unit 325, and the storage unit 31 stores the first information 31A corrected by the correction unit 325A.

With this configuration, the information processing device 30 can estimate the interaction between the plurality of first objects based on the first information 31A, and can correct the first information 31A based on the estimation result. As a result, by correcting the first information 31A based on the interaction between the physical bodies captured in the virtual space V, the information processing device 30 can achieve more natural expression of the interaction between the first object and the second object.

The processing unit 327 of the information processing device 30 executes a process of expressing an interaction occurring between the plurality of first objects in the virtual space V based on the plurality of pieces of first information 31A and the motion of the second object.

With this configuration, the information processing device 30 can express an interaction between the plurality of first objects based on the motion of the second object in the virtual space V and the structure and physical properties of the first object. As a result, the information processing device 30 can express the interaction between the plurality of first objects obtained by capturing the first objects into the virtual space V, making it possible to achieve natural expression of the first objects displayed in the virtual space V.

The specifying unit 326 of the information processing device 30 specifies the arrangement of the third object operable by the second object in the virtual space V based on the arrangement condition of the third object and on the first information 31A, and the processing unit 327 executes a process of expressing the interaction occurring between the third object and the first object based on a characteristic of the third object and on the first information 31A.

With this configuration, the information processing device 30 can express an interaction between the third object and the first object based on the third object in the virtual space V and the structure and physical properties of the first object. As a result, the information processing device 30 can express the interaction between the third object operable by the second object, and the first object, making it possible to achieve natural expression of the third object displayed in the virtual space V.

An information processing method is a method to be executed by a computer, and the method includes: storing, in the storage unit 31, the first information 31A indicating at least one of a structure or a physical property of a first object obtained by capturing a real physical body into a virtual space; and specifying an arrangement of a second object indicating a virtual object in the virtual space V so that the arrangement is capable of expressing an interaction with the first object, based on the arrangement condition 31C of the second object and on the first information 31A.

With this configuration, by arranging, by the computer, the second object at a position where the second object can interact with the first object in the virtual space V into which the real environment has been captured, the information processing method is capable of suppressing a gap occurring between the first object and the second object in the virtual space V. As a result, the information processing method is capable of suppressing the strangeness or incompatibility of the second object displayed in the virtual space V into which the measured real environment has been captured.

A program causes a computer to execute processes including: storing, in the storage unit 31, the first information 31A indicating at least one of a structure or a physical property of a first object obtained by capturing a real physical body into a virtual space; and specifying an arrangement of a second object indicating a virtual object in the virtual space V so that the arrangement is capable of expressing an interaction with the first object, based on the arrangement condition 31C of the second object and on the first information 31A.

With this processes, the program can cause the computer to arrange the second object at a position where the second object can interact with the first object in the virtual space V into which the real environment has been captured, making it possible to suppress a gap generated between the first object and the second object in the virtual space V. As a result, the program is capable of suppressing the strangeness or incompatibility of the second object displayed in the virtual space V into which the measured real environment has been captured.

Note that the following configurations also belong to the technical scope of the present disclosure.

(1)

An information processing device comprising:

a storage unit that stores first information indicating at least one of a structure or a physical property of a first object obtained by capturing a real physical body into a virtual space; and a specifying unit that specifies an arrangement of a second object indicating a virtual object in the virtual space so that the arrangement is capable of expressing an interaction with the first object, based on an arrangement condition of the second object and on the first information.

(2)

The information processing device according to (1), wherein the specifying unit specifies the arrangement of the second object in the virtual space so that the arrangement satisfies physical conditions between a part of the second object and the first object corresponding to the arrangement condition and so that the arrangement is capable of expressing an interaction with the first object.

(3)

The information processing device according to (1) or (2), wherein the specifying unit specifies the arrangement of the second object in the virtual space so that the arrangement is capable of expressing an interaction with the first object based on a positional relationship of components of the first object in the virtual space.

(4)

The information processing device according to any one of (1) to (3), wherein the specifying unit specifies the arrangement of the second object in the virtual space so that the arrangement is capable of expressing an interaction with the first object based on second information indicating a characteristic of the second object, the arrangement condition, and the first information.

(5)

The information processing device according to any one of (1) to (4), wherein, when it is not possible to specify the arrangement of the second object in the virtual space so that the arrangement is capable of expressing an interaction with the first object, the specifying unit specifies the arrangement of the second object based on another arrangement condition different from the arrangement condition.

(6)

The information processing device according to any one of (1) to (4), wherein, when it is not possible to specify the arrangement of the second object in the virtual space so that the arrangement is capable of expressing an interaction with the first object, the specifying unit does not arrange the second object in the virtual space.

(7)

The information processing device according to any one of (1) to (6), further comprising a processing unit that executes a process of expressing an interaction between the first object and the second object based on the arrangement of the second object in the virtual space having been specified by the specifying unit and on the first information.

(8)

The information processing device according to any one of (1) to (7), further comprising a recognition unit that generates the first information based on a recognition result obtained by recognizing a real physical body and on information indicating a structure and physical properties, wherein the storage unit stores the first information generated by the recognition unit.

(9)

The information processing device according to (8), further comprising:

a detection unit that detects a missing defect of the real physical body based on the first information generated by the recognition unit; and a complementing unit that changes the first information so as to complement a missing defect of the real physical body when the missing defect of the real physical body has been detected, wherein the storage unit stores the first information changed by the complementing unit.

(10)

The information processing device according to (8) or (9), further comprising:

an estimation unit that estimates an interaction between a plurality of the first objects based on the first information generated by the recognition unit; and a correction unit that corrects the first information based on an estimation result of the estimation unit, wherein the storage unit stores the first information corrected by the correction unit.

(11)

The information processing device according to (7), wherein the processing unit executes a process of expressing an interaction occurring between a plurality of the first objects in the virtual space based on a plurality of pieces of the first information and a motion of the second object.

(12)

The information processing device according to (7), wherein the specifying unit specifies an arrangement of a third object operable by the second object in the virtual space based on an arrangement condition of the third object and on the first information, and the processing unit executes a process of expressing an interaction occurring between the third object and the first object based on a characteristic of the third object and on the first information.

(13)

An information processing method executed by a computer, the method comprising:

storing, in a storage unit that stores first information indicating at least one of a structure or a physical property of a first object obtained by capturing a real physical body into a virtual space; and specifying an arrangement of a second object indicating a virtual object in the virtual space so that the arrangement is capable of expressing an interaction with the first object, based on an arrangement condition of the second object and on the first information.

(14)

A program for causing a computer to execute:

storing, in a storage unit, first information indicating at least one of a structure or a physical property of a first object obtained by capturing a real physical body into a virtual space; and specifying an arrangement of a second object indicating a virtual object in the virtual space so that the arrangement is capable of expressing an interaction with the first object, based on an arrangement condition of the second object and on the first information.

REFERENCE SIGNS LIST

10 SENSOR UNIT
20 DISPLAY DEVICE
30 INFORMATION PROCESSING DEVICE
31A FIRST INFORMATION
31B SECOND INFORMATION
31C ARRANGEMENT CONDITION
31M MAP INFORMATION
32 CONTROL UNIT
321 MEASUREMENT UNIT
322 FIRST RECOGNITION UNIT
323 SECOND RECOGNITION UNIT
324 MISSING DEFECT DETECTION UNIT
324A MISSING DEFECT COMPLEMENTING UNIT
325 ESTIMATION UNIT
325A CORRECTION UNIT
326 SPECIFYING UNIT
327 PROCESSING UNIT
328 DISPLAY CONTROL UNIT
C OBJECT
P REAL ENVIRONMENT
R PHYSICAL BODY OBJECT
V VIRTUAL SPACE

The invention claimed is:

1. An information processing device, comprising:
circuitry configured to:
acquire structure information static object based on measurement information of a sensor configured to capture a real space;
represent the real static object as a virtual static object in a virtual space;
determine a partial structural defect of the virtual static object due to failure of recognition of the real static object;
acquire, from a 3D model database, 3D model data corresponding to the real static object;
modify the virtual static object to complement the partial structural defect, wherein the partial structural defect is complemented based on the 3D model data corresponding to the real static object; and
arrange, after the partial structural defect is complemented, a virtual human object in the virtual space to contact the modified virtual static object.

2. The information processing device according to claim 1, wherein
the circuitry is further configured to arrange the virtual human object in the virtual space based on physical conditions between the virtual human object and the modified virtual static object.

3. The information processing device according to claim 1, wherein
the circuitry is further configured to arrange the virtual human object in the virtual space based on a positional relationship of components of the modified virtual static object in the virtual space.

4. The information processing device according to claim 1, wherein
the circuitry is further configured to arrange the virtual human object in the virtual space based on information indicating a characteristic of the virtual human object, an arrangement condition corresponding to the contact between the virtual human object and the modified virtual static object, and the structure information.

5. The information processing device according to claim 1, wherein the circuitry is further configured to:
specify a first arrangement condition corresponding to the contact between the virtual human object and the modified virtual static object; and
specifying unit specifies the specify a second arrangement condition corresponding to the contact between the virtual human object and the modified virtual static object based in a case where the first arrangement condition is unsatisfied, wherein the second arrangement condition is different from the first arrangement condition.

6. The information processing device according to claim 1, wherein the circuitry is further configured to:
estimate an interaction between a plurality of real static objects based on the measurement information of the sensor; and
correct the structure information based on the estimated interaction.

7. The information processing device according to claim 1, wherein the circuitry is further configured to
arrange the virtual human object in the virtual space based on a motion of the virtual human object.

8. The information processing device according to claim 1, wherein the circuitry is further configured to:
arrange virtual object operable by the virtual human object in the virtual space based on an arrangement condition of the virtual object and on the structure information; and
execute a process to express an interaction virtual object and the virtual static object based on a characteristic of the virtual object and on the structure information.

9. An information processing method executed by a computer, the method comprising:
acquiring structure information of a static object based on measurement information of a sensor configured to capture a real space;
representing the real static object as a virtual static object in a virtual space;
determining a partial structural defect of the virtual static object due to failure of recognition of the real static object;
acquiring, from a 3D model database, 3D model data corresponding to the real static object;
modifying the virtual static object to complement the partial structural defect, wherein the partial structural defect is complemented based on the 3D model data corresponding to the real static object; and
arranging, after the partial structural defect is complemented, a virtual human object in the virtual space to contact the modified virtual static object.

10. A non-transitory computer-readable medium having stored thereon computer-executable instructions that, when executed by a computer, cause the computer to execute operations, the operations comprising:

acquiring structure information of a real static object based on measurement information of a sensor configured to capture a real space;

representing the real static object as a virtual static object in a virtual space;

determining a partial structural defect of the virtual static object due to failure of recognition of the real static object;

acquiring, from a 3D model database, 3D model data corresponding to the real static object;

modifying the virtual static object to complement the partial structural defect, wherein the partial structural defect is complemented based on the 3D model data corresponding to the real static object; and arranging, after the partial structural defect is complemented, a virtual human object in the virtual space to contact the modified virtual static object.

* * * * *